US008204790B1

(12) United States Patent
Rogers et al.

(10) Patent No.: US 8,204,790 B1
(45) Date of Patent: Jun. 19, 2012

(54) SYSTEM AND METHOD FOR MATCHING BUYERS AND SELLERS

(76) Inventors: Brett Berton Rogers, Round Hill, VA (US); Robert Edward Woods, Silver Spring, MD (US)

( * ) Notice: Subject to any disclaimer, the term of this patent is extended or adjusted under 35 U.S.C. 154(b) by 0 days.

(21) Appl. No.: 12/423,788

(22) Filed: Apr. 14, 2009

(51) Int. Cl.
*G06Q 30/00* (2006.01)

(52) U.S. Cl. ...................................... 705/26.1

(58) Field of Classification Search ............ 705/26, 705/27, 26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2
See application file for complete search history.

(56) References Cited

U.S. PATENT DOCUMENTS

| | | | | |
|---|---|---|---|---|
| 5,500,793 A * | 3/1996 | Deming et al. | ................. | 705/37 |
| 5,794,207 A * | 8/1998 | Walker et al. | .................. | 705/77 |
| 6,108,639 A * | 8/2000 | Walker et al. | ............... | 705/26.2 |
| 6,260,024 B1 * | 7/2001 | Shkedy | .......................... | 705/37 |
| 6,847,938 B1 * | 1/2005 | Moore | ............................ | 705/26 |
| 6,868,392 B1 * | 3/2005 | Ogasawara | .................... | 705/10 |
| 7,124,107 B1 * | 10/2006 | Pishevar et al. | ................ | 705/37 |
| 7,464,051 B1 * | 12/2008 | Heggem | ....................... | 705/26.2 |
| 2004/0117294 A1 * | 6/2004 | Ferraro et al. | .................. | 705/37 |
| 2010/0180232 A1 * | 7/2010 | Honan et al. | .................. | 715/811 |

OTHER PUBLICATIONS

John D. Benjamin et al. "Pricing, Exposure and Residential Listing Strategies", JPER, vol. 20, No. 1/2, 2000.*
Glenn S. Dorfman "Real Estate Industry Scan: Trends, Industry Practice, Innovation & Change", Minnesota Realtors, 2004.*

* cited by examiner

*Primary Examiner* — Naeem Haq

(57) ABSTRACT

Utilizing a "demand-side" framework for bringing together prospective buyers and sellers. Buyers can broadcast their needs in the form of a request for proposal ("RFP") to prospective sellers using the system. Social networking tools can be incorporated into the system to make searches more efficient or targeted. Customized interfaces can be used to launch applications, form work teams, manage RFPs, negotiate deals, and network both generally and with respect to specific projects.

19 Claims, 33 Drawing Sheets

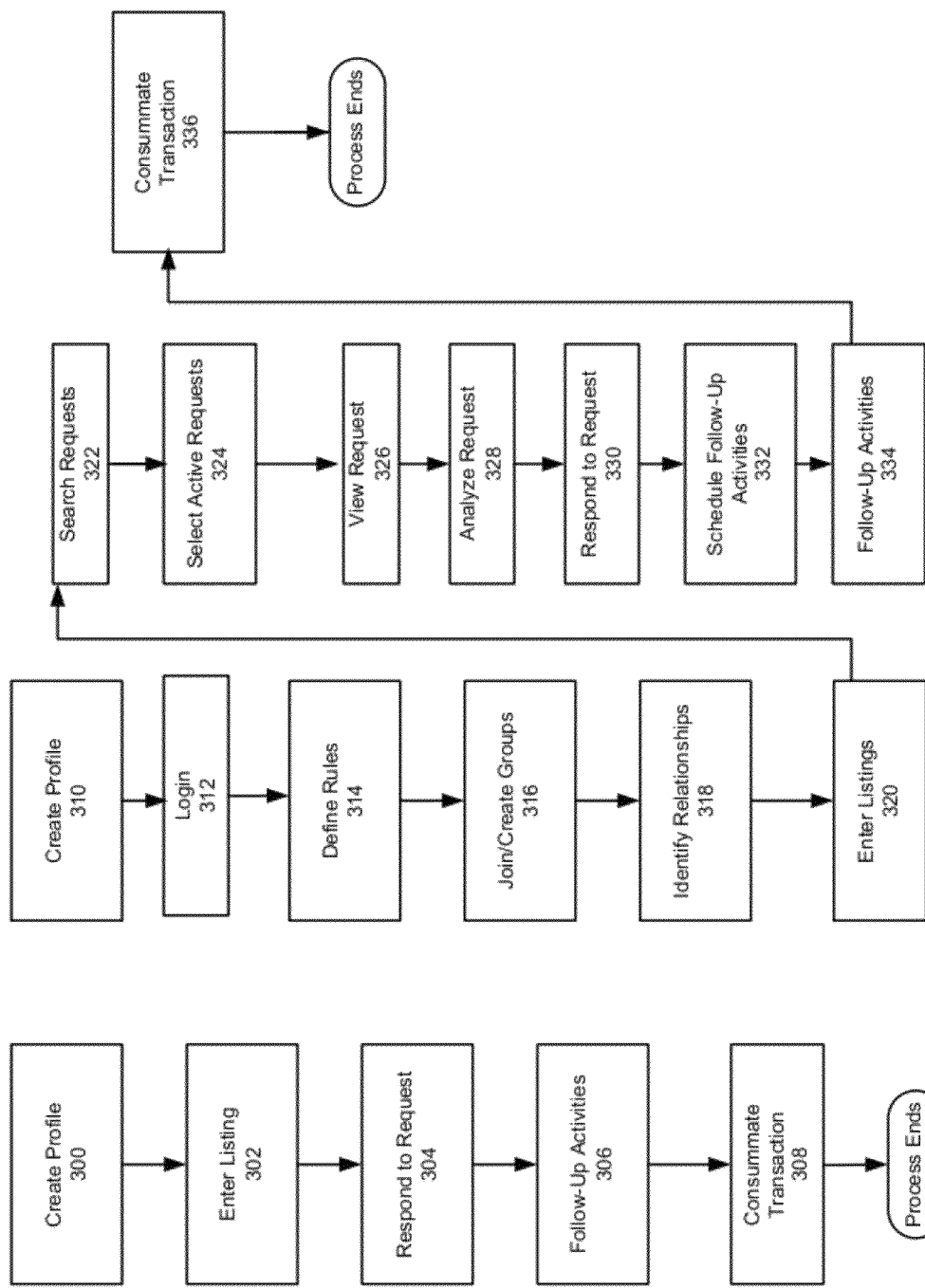

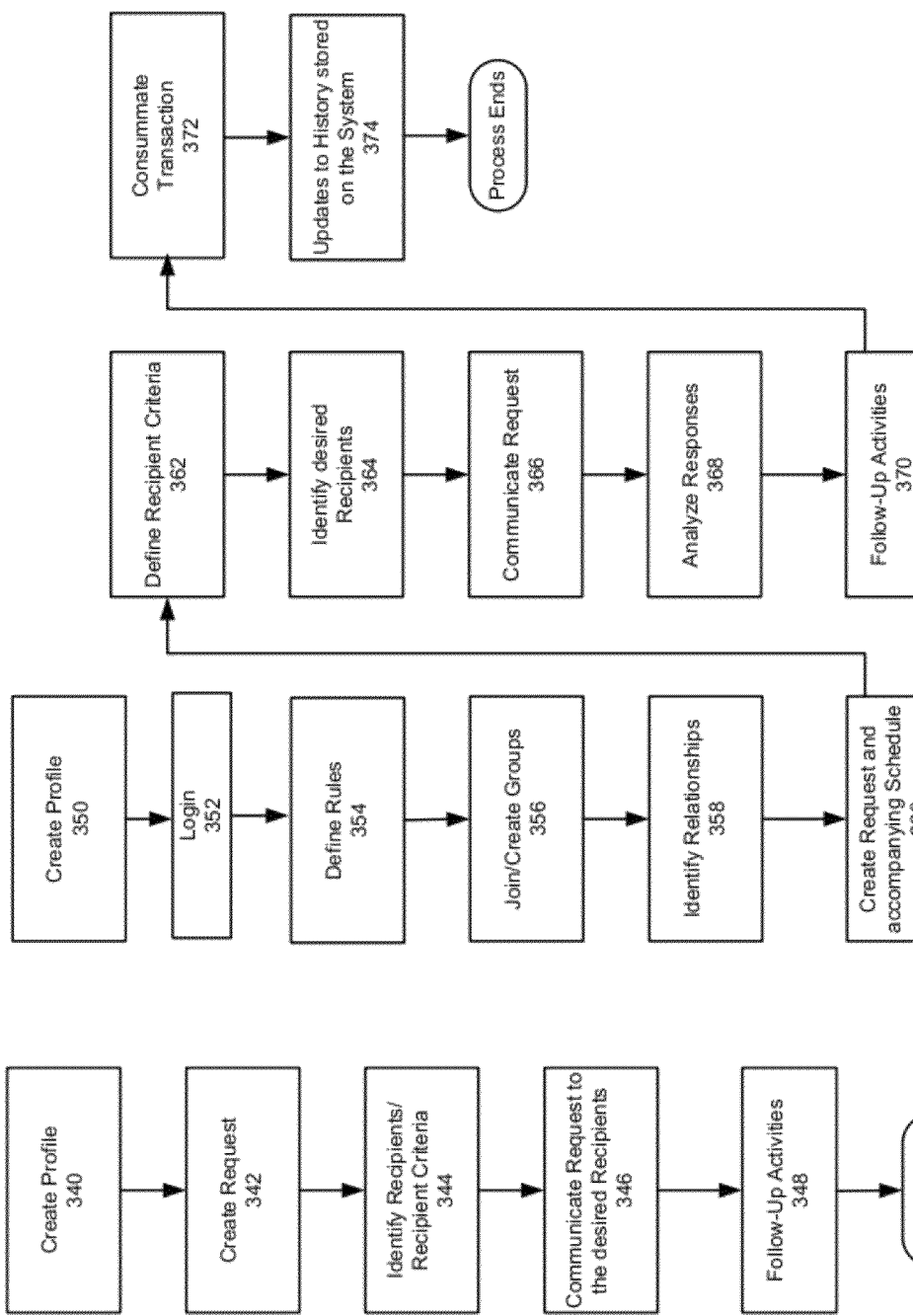

Space Request [ Status: Draft ]

Name your search:

Bethesda Class A Office

Transaction Type

⦿ For Lease
○ For Sale

Target Location

State *
Maryland

Region
Suburban Washington D.C.

Market
Montgomery County

Submarket
Bethesda/Chevy Chase

Property Type(s) * ☐ Other ☐ Medical ☑ Office ☐ Industrial

Tenant Type

⦿ Single Tenant
○ Multi Tenant
○ Both

Intended Use *

High-end Class A headquarters for a legal firm. Needs include an impressive lobby, at least 3 conference rooms (2 large, 1 smaller), internal kitchen/lunchroom facilities. See other needs in the Special Features section.

Lease Details

Square Footage (Min / Max) * 15000 / 25000

Lease Rate($/SF) (Min/Max) *
50
75

⦿ Monthly
○ Yearly

Figure 6b

Distribution Type

Use the below to determine who can see your RFP. When you save the RFP, an e-mail will be sent to those people you've indicated that you want to see it (Associates and Non-Sibdu Members). If you've chosen to allow a private group(s) to see your RFP, it will be directly posted in the groups you've chosen. See the instructions under the Private Groups tab to post to Public Groups.

○ Make available for public search.
○ Private (Actively distribute to select people and private groups).

Save Draft    Submit

Open RFPs

| | TITLE | LOCATION | TRANSACTION | MIN SF | MAX SF | TYPE | MATCHES | DEADLINE |
|---|---|---|---|---|---|---|---|---|
| 1 | Test RFP_11-25 | Illinois<br>Chicago<br>Rockford<br>Rockford | For Lease | 7,500 | 10,000 | Other | 0 | Monday, December 1, 2008<br>Extend |
| 2 | TEST RFP - Will be deleted by 12-1 | Ohio<br>Cincinnati<br>Tri-County<br>Tri-County | For Lease | 5,000 | 15,000 | Medical | 0 | Sunday, February 1, 2009<br>Extend |
| 3 | Bethesda Class A Office | Maryland<br>Suburban Washington D.C.<br>Montgomery County<br>Bethesda/Chevy Chase | For Lease | 15,000 | 25,000 | Office | 2 | Wednesday, July 1, 2009<br>Extend |

View   Edit   Close RFP   Matches (2)

Details

| | |
|---|---|
| Rent | Annually | $60.00 |
| Property Type(s) | Other |
| Property Type(s) | Medical |
| Property Type(s) | Office |
| Annual CAMS | |
| Annual Real Estate | |
| Taxes | |
| Parking Ratio | |
| Zoning | |
| Use Restrictions | |

Contact Information

Bob Woods at CapStar Commercial Realty
Phone: 301-738-7777
Email: bob_woods@verizon.net

Closed RFPs

| | TITLE | LOCATION | TRANSACTION | MIN SF | MAX SF | TYPE | MATCHES | DEADLINE | |
|---|---|---|---|---|---|---|---|---|---|
| 1 | Rockville - Medical Office | Maryland<br>Suburban Washington D.C.<br>Montgomery County<br>Rockville Pike Corridor | For Lease | 2,500 | 5,000 | Medical | Short Listed ( 0 )<br>0 | Sunday, February 1, 2009 | |
| 2 | Herndon - Church/Religious | Virginia<br>N Virginia/Suburban D.C.<br>Fairfax County<br>Reston-Herndon | For Sale | 25,000 | 50,000 | Other | Short Listed ( 0 )<br>0 | Sunday, March 1, 2009 | |
| 3 | Test RFP_11-25 | Illinois<br>Chicago<br>Rockford<br>Rockford | For Lease | 7,500 | 10,000 | Other | Short Listed ( 0 )<br>0 | Monday, December 1, 2008 | |
| 4 | Bethesda Class A Office | Maryland<br>Suburban Washington D.C.<br>Montgomery County<br>Bethesda/Chevy Chase | For Lease | 15,000 | 25,000 | Office | Short Listed ( 0 )<br>Not Short Listed (<br>2<br>) | Wednesday, July 1, 2009 | |

Inventory Item [ Status:New ]

Expiration Date: Wednesday, September 23, 2009
Title:

Transaction Type

○ For Lease
○ For Sale

Market

State*

Region

Market

Submarket

Address

Address *

Address2

City *

State *

Zip Code *

Property Details

Property SF *

Acres

Parking Ratio

Permitted Uses

Figure 6z

SYSTEM AND METHOD FOR MATCHING BUYERS AND SELLERS

BACKGROUND OF INVENTION

The invention is a system and method for matching buyers and sellers (collectively the "system").

Technologies such as the Internet and the World Wide Web have greatly enhanced the ability of prospective buyers and sellers to identify and communicate with one another. However, in many respects, information technology tools have been used to simply digitize and automate methods of conducting business without taking the opportunity to re-evaluate, re-engineer, re-design, and otherwise improve upon processes which were designed with substantially older technologies in mind. The application of innovative information technology does not inherently result in changes to underlying framework of a process. To the contrary, the implementation of flashy new technology can often mask opportunities to fundamentally improve the way business is conducted. The inertia of doing things a certain way "because that is the way that they have always been done it" is difficult to overcome, particularly when what is being changed pertains to the interactions of different people and organizations who may have no prior knowledge of each other. Changing the way parties interact with each other requires all of the parties to embrace the change in an organic and systematic manner. The prior art often fails to take advantage of new ways for different persons and organizations to interact with each other.

Many different types of websites exist to bring sellers and buyers together, but almost all such sites involve a certain degree of needless inefficiency. Despite the various technical bells and whistles that may be implemented on a particular website, the majority of sites operate from a purely "supply" perspective rather than a "demand" perspective. For example, in the context of the real estate business, websites typically provide users with access to available listings that are available "for sale" or "for lease." After the listing is uploaded, the seller is then typically relegated to the role of waiting for responses or spending resources in an effort to drive more prospective buyers to the listing. The role of the buyer is similarly unsatisfying, as a listing may not address all of the prospective buyer's criteria for a desirable transaction and thus such websites can force a prospective buyer to waste time contacting prospective sellers in situations where the asset in question is ultimately of no interest to the prospective buyer. Instead of simply displaying attributes that are believed to be important to the seller in a "supply" perspective, it can be advantageous to allow prospective buyers to drive the process from a "demand" perspective because it is the attributes desired by the buyer that will ultimately determine whether or not a transaction will occur between the two parties. This also allows the seller to better focus on the attributes most important to the potential buyer. Focusing exclusively or even primarily on the "supply" perspective is in many instances an inefficient way to bring buyers and sellers together. The overemphasis of a "supply-side" focus is particularly pronounced in the context of real estate transactions and other types of non-commodity transactions where the assets are unique and there are potentially manner different attributes or combinations of attributes that are important to the buyer.

Another weakness of online transaction systems is that they tend to focus narrowly on consummating a particular transaction rather than establishing and developing ongoing connections between parties that can prove valuable beyond the scope of an individual transaction. In the business world, ongoing relationships are often as important if not more important, than the specific transaction. In many contexts, who you buy something from is just as important if not more important than what is being purchased. Despite the importance of business relationships in shaping a transaction, in many contexts, there is no effort to match people instead of assets.

SUMMARY OF THE INVENTION

The invention is a system and method for matching buyers and sellers (collectively the "system").

The system can be implemented from a "demand" (i.e. demand-side) perspective, allowing buyers to broadcast their needs and requirements while allowing the system to assist in the identification of sellers of interest for the buyer's consideration. The system can also assist buyers in identifying seller requests that are likely to be of interest to the buyer. The system can facilitate the matching of buyers and sellers based on information that is not limited to attributes pertaining to a specific transaction. In some instances, matching can be performed using exclusively non-transaction specific information while on other embodiments, combinations of transaction-specific and non-transaction attributes will be utilized by the system. Social networking tools can be incorporated into the system, including public or private membership groups and associations formed between participants of the system. Users of the system can personalize and customize their respective interfaces in accordance with their preferences and processing rules to enhance the utility of the system. Customized interfaces can be used to launch applications, form work teams, manage requests for proposals ("RFPs"), negotiate deals, and network both generally and with respect to specific projects. The system can be used to broadcast (i.e. communicate or transmit) requests to potential transaction partners on the basis of group affiliations, sub-group affiliations, relationships, or virtually any attribute of which the system is cognizant of.

The system can be more fully understood upon reading the accompanying drawings that are discussed briefly below.

BRIEF DESCRIPTION OF THE DRAWINGS

The following drawings illustrate some different examples and embodiments of the system:

FIG. 5a is flow chart diagram illustrating an example of a process by which a seller can utilize the system to consummate a transaction.

FIG. 5b is a flow chart diagram illustrating an example of a process by which a seller can utilize the system to consummate a transaction.

FIG. 5c is a flow chart diagram illustrating an example of a process by which a buyer can utilize the system to consummate a transaction.

FIG. 5d is a flow chart diagram illustrating an example of a process by which a buyer can utilize the system to consummate a transaction.

FIG. 6b is an interface view illustrating an example of a screen that can be used to create or modify a request.

FIG. 6c is an interface view illustrating an example of a screen that can be used to define whether or not a particular request is accessible to the public at large via a search of the system.

FIG. 6d is an interface view illustrating an example of a screen that can be used to facilitate matches with other parties through a search in which the user defines the parameters.

FIG. 6e is an interface view illustrating an example of a screen that can be used to select recipients for a seller request.

FIG. 6f is an interface view illustrating an example of a screen that can be used to select recipients for a seller request on the basis of group affiliations.

FIG. 6g is an interface view illustrating an example of a screen that can be used to identify potential recipients who are not users of the system for a seller request.

FIG. 6k is an interface view illustrating an example of a screen that can be used to view details pertaining to a pending request.

FIG. 6l is an interface view illustrating an example of a screen that displays an overview of a pending request.

FIG. 6m is an interface view illustrating an example of a screen that can be used by sellers to identify matches between a received request and listings in inventory.

FIG. 6p is an interface view illustrating an example of a screen that can be used by buyers to manage their various requests that are in the system.

FIG. 6q is an interface view illustrating an example of a screen that can be used by buyers to manage a specific request.

FIG. 6r is an interface view illustrating an example of a screen that can be used by buyers to view and manage proposals received in response to their requests.

FIG. 6t is an interface view illustrating an example of a screen that can be used to facilitate communications between a buyer and a seller after a seller has responded to a request with a proposal.

FIG. 6u is an interface view illustrating an example of a screen that can be used by supply side users (e.g. sellers) to view the status of their proposals with respect to specific requests as specified by the applicable demand side users (e.g. buyers).

FIG. 6v is an interface view illustrating an example of a screen that can be used by a buyer to shortlist proposals sent in response to the buyer's requests.

FIG. 6w is an interface view illustrating an example of a screen that can be used to manage proposals after they have been sent in response to requests.

FIG. 6z is an interface view illustrating an example of a screen that can be used by a seller to create a listing.

FIG. 6aa is an interface view illustrating an example of a screen that be used by buyers and sellers to include images, documents, and video files as parts of requests and proposals.

Figure 1:
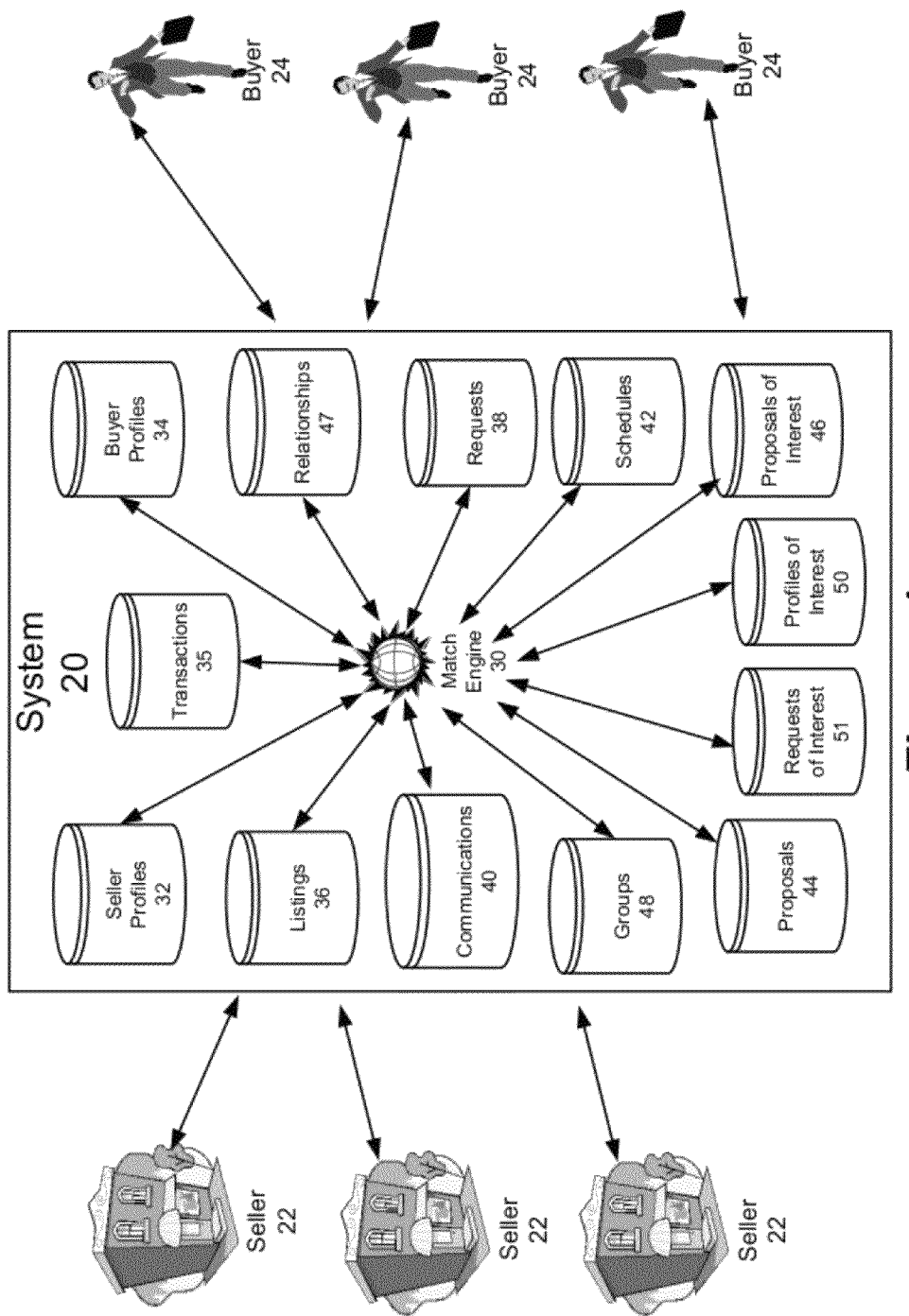
FIG. 1 is a block diagram illustrating an example of different buyers and sellers interacting with each other by interacting with the system that includes a match engine and various data elements that can be used to influence the processing of the system.

The system can be more fully understood upon reading the following detailed description.

DETAILED DESCRIPTION

I. Overview

The invention is a system and method for matching buyers and sellers (collectively the "system"). Buyers and sellers can interact with each other and various third parties in meaningful ways through their interactions with the system. The system can be used to facilitate and enhance ongoing relationships outside the context of any particular transaction. Those relationships can then be leveraged for the purpose of facilitating a particular transaction or set of transactions. The system can be configured to store historical information that can be used by buyers, sellers, and the system itself to make future decisions and configure future processing.

Preferences, profiles, and processing rules can be defined within the system, allowing for semi-automated or even fully automated processing pertaining to communications for furthering a transaction and scheduling follow-up activities as the parties proceed from initial interactions with what can be a relatively large number of other parties to more detailed and specific communications with a relatively small number of other parties as transaction partners are "shortlisted" and narrowed down. In some contexts, there could be only a single round of shortlisting. In other contexts, shortlisting can be a continuous and iterative process for winnowing down the number of interesting transaction partners, interesting proposals, and interesting assets.

The system provides users with the ability to communicate their interests very rapidly and comprehensively to a potentially large audience in a highly targeted and criteria-based manner in order to expedite the process of identifying transactional opportunities. Criteria can be based on attributes pertaining to an entity, a proposal, an asset, or an external event. Users also have the ability to receive a wide range of communications that can be filtered and prioritized based on the receiving user's profile, history, relationships, group affiliations, assets, inventory, calendar, and other criterion. Various algorithms can be used to support automated searches and other criteria-based processing using the applicable user profile in conjunction with data supplied by the user. The system can provide users with a wide variety of different communication opportunities, and a wide variety of different approaches for identifying which transaction opportunities are of greatest interest and value to the user.

Just as the process of filtering communications can be enhanced by various algorithms, the process by which a pool of potential transaction parties is winnowed down to one or two can also be significantly enhanced by the system. The interactive exchanges of information can be done in accordance with a schedule defined and enforced within the system. Automated notifications can enhance the ability of all participating parties to manage the transaction-building process. The communication functionality of the system can decrease the time required for complex requisitions of goods and services.

Unlike many transaction-related approaches, the system can be implemented such that the demand side of a transaction (i.e. the buyer) is the party who initiates transaction-specific processing by creating and submitting a request for proposals. In such embodiments, sellers respond to the requests provided by buyers with proposals that can include one or more asset listings from the inventory of the seller. In other embodiments, a more traditional supply side perspective can be implemented, with potential buyers being able to utilize the system for more detailed follow-up inquiries that resemble in many respects, the buyer requests in a demand side approach.

The system can facilitate a wide variety of different ways for buyers to identify potential sellers. Buyers can manually identify certain recipients for a request on the basis of whatever criteria the buyer sees fit. Even the manual selection of potential transaction partners can be enhanced by the social networking functions of the system. For example, the system can be implemented in such a manner as to include social networking features such as business news feeds (industry centered news feeds if the system is implemented for a specific category of business transactions), private instant messaging and text messaging, group and sub-group bulletin boards, blogs, chat rooms, member searches, online videos, and other interaction-promoting activities.

Users can also utilize the automated algorithms, heuristics, and processes of the system to facilitate the identification of potential transaction partners. In the example of a demand side implementation of the system for the real estate industry, requests for proposal can be sent to automatically identified sellers. Sellers can be selectively identified on the basis of their profile, past transactions, relationships with third parties, volume of available inventory, group memberships, past proposals, pre-defined response schedules, vacancy deadlines, asset locations, operation or performance related metrics, recent searches performed by the seller, certifications, verifications, notifications, empirical data, reports, certifications, verifications, location attributes, approvals, external activities or events, and/or virtually any other data element that is monitored or processed by the system.

Seller-side processing can also benefit from heuristics that assist sellers in identifying interesting requests and interesting buyers, as well as identifying particular asset listings that should be included in certain proposals.

Sellers and buyers can create and join a variety of different groups and sub-groups. The system can be used to define a variety of different relationships between different users of the systems. Group associations and other relationships can be used to trigger automated processing and otherwise influence the communications between different users as well as influence the requests, proposals, listings, and profiles that are identified as "interesting" to the user. Groups can be public or private, with various different rules of membership.

The system can support user-defined rules that impact a variety of different processes performed by the system. For example, a buyer could define a request that allows a seller to remain anonymous while providing an initial proposal in response to the request. Similarly, a seller can submit a proposal in response to a request by a buyer in which current inventory information, various ratings, and other vendor metrics are not accessible until after the initial short listing of interesting proposals by the seller. Some embodiments of the system can automatically verify whether a particular proposal by a seller complies with the requirements of a request by the buyer. A variety of automated validation processing can be used to enhance the quality and timing of communications exchanged between buyers and sellers.

The system can be particularly useful in transactions involving complex and unique assets. For example, transactions involving real estate, intellectual property licensing, business divestitures, outsourcing arrangements, professional services, and other similarly complex transactions can involve a wide range of different criteria that are critically important to both parties. Purely commodity transactions presumably involve fewer variables, making it easier for buyers and sellers to more quickly identify each other. Nonetheless, the system can be highly beneficial in facilitating even more commodity-like transactions. The system can be used to buyers and sellers to define the criteria that matter to them, to facilitate the relationships that pertain to such criteria, and to use the tools of the system to facilitate the mutual benefit of both buyers and sellers.

Some embodiments of the system can also incorporate information that is independent of any users of the system. Market research and objective economic and other forms of metrics can be incorporated into the processing of the system. For example, interest rates, inflation rates, unemployment rates, relative currency values, stock market indexes, and other types of financial and/or economic data can be factored into the processing performed by the system. Dynamic data can be accessed and utilized by various users in accordance with their own processing rules.

II. Introduction of Elements and Definitions

FIG. 1 is a block diagram illustrating an example of a match engine 30 being incorporated into a system 20 used to support interactions between various individual persons, families, businesses, partnerships, limited liability companies, corporations, unions, trade groups, non-profit groups, religious organizations, professional associations, government agencies, franchisees, franchisors, distributors, agents, marketers, and brokers (collectively "entities").

A. Entities

The system 20 can facilitate transactions between two or more entities. Most transactions involve only two entities, but complex transactions involving three or more entities can be facilitated by some embodiments of the system 100. Different entities can utilize a different level of automation in utilizing the benefits of the system 20. For example, despite the benefits of the automated processing that the system 20 can provide, the system 20 can be implemented in such a manner as to allow an individual consumer to interact with the system 20 in a purely manual manner. On the other end of the continuum, the system 20 can be configured in such a manner as to allow a large web-based merchant to interact with the system 20 in a fully automated manner using various algorithms, neural networks, artificial intelligence, expert systems, avatars, or similar forms of automated processing (collectively "Automated Agents"). Many entities will decide to interact with the system 20 in semi-automated manner. The system 20 can be configured in such a manner as to allow users to determine when they are comfortable with automated processing, and what tasks should be performed in a manual or semi-manual manner.

Although the system 20 can involve the participation of a wide variety of different entities, with the context of a particular transaction, entities are associated with a relatively finite number of roles. An entity can have more than one role with respect to its participation in the system 20. However, within the confines of a particular transaction, an entity is typically associated with only one role, although it is possible for a single entity to participate in a complex transaction through multiple roles. For example, in a three way transaction, Party #1 could be a buyer with respect to Party #2 but a seller with respect to Party #3.

1. Buyers

In many embodiments of the system 20, a buyer 24 is the entity who initiates transaction-specific processing by creating and submitting a request 38. In addition to the prototypical example of a buyer 24 being an entity who provides monetary consideration in exchange for receiving a product or service from a seller 22, examples of buyers 24 can also include but are not limited to tenants, lessees, licensees, patients, travelers, insured entities, consignment purchasers, receivers of goods and/or services, and subscribers. In many embodiments of the system 20 ("demand-side embodiments"), it is the buyers 24 who initiate processing in the system 20 with respect to a particular transaction by creating and distributing a request 38 to one or more sellers 22. In a demand-side embodiment of the system 20, it is the buyer 24 who initiates a transaction request 38 that defines the contours of a potential transaction.

2. Sellers

A prototypical example of a seller 22 is an entity that provides goods and/or services to a buyer 24 in exchange for financial or other consideration provided by the buyer 24. Other examples of sellers 22 can include but are not limited to landlords, licensors, lessors, publishers, manufacturers, distributors, and providers of good and/or services. A seller 22 need not be the source of the good or service being provided to the buyer 24. For example, many businesses sell products that they do not themselves manufacture or services that the do not themselves provide directly. In some instances, the consideration paid by a buyer 24 to a seller 22 is not limited to financial consideration and in fact may not even include financial consideration. In a demand-side embodiment of the system 20, the seller 22 responds to a request 38 of the buyer 24 with a proposal 44 that includes one or more asset listings 36 offered by the seller 22. Some embodiments of the system 20 can be configured to facilitate large complex transactions in which a seller 22 can utilize one or more subcontractors.

3. Brokers

FIG. 1 does not illustrate an example of a broker interacting with the system 20, but brokers can fully participate in the functionality of the system 20. A broker is an entity that represents other users of the system 20. For example, a broker can participate in the system 20 on behalf of a seller 22 with respect to a particular transaction and on behalf of a buyer 24 with respect to a different transaction. Like any other user of the system 20, each broker is typically associated with the role of a buyer 24 or a seller 22 with respect to a specific transaction. Some embodiments of the system 20 can be configured to capture and store information pertaining to broker compensation requirements, past transactions with the system 20, affiliations with various groups 48, relationships 47, and other attributes which may be of interest to third parties. In many embodiments, it is the broker who determines what information is accessible to third parties, but in some circumstances, the system 20 can be configured to factor in information to certain automated processes that are not publicly accessible.

4. Administrators

FIG. 1 does not illustrate an example of an administrator interacting with the system 20, but all embodiments of the system 20 will require personnel to maintain the system 20. In many embodiments of the system 20, the functionality of the system 20 is supported and maintained by an application service provider ("ASP") who does not function in the role of a buyer 24 or seller 22 using the system 20. In other embodiments, the system 20 can be supported, operated by, and maintained by an entity that also participates in the transactions of the system 20. ASP embodiments of the system 20 can be desirable to encourage use of the system 20 by the operation of the system 20 by a neutral entity.

B. Match Engine

As discussed below, the system 20 can include a wide variety of different configurations of software, hardware, access devices, databases, and interfaces. The system 20 can also include a variety of different match engines 30 used by the system to facilitate interactions between buyers 24 and sellers 22. A variety of different match engines 30 can be used by the system 20 to facilitate buyers 24 in identifying sellers 22 with which they wish to conduct business and conversely to facilitate sellers 22 in identifying buyers 24. The match engine 30 can be highly dynamic, allowing different entities to significantly configure the system 20 to accommodate automated processing based on criteria and processing rules defined by the applicable entity. The match engine 30 can operate in a purely manual manner, a purely automated manner, or a semi-automated manner. The match engine 30 can identify or assist users in identifying entities and/or specific assets for potential transaction opportunities. The match engines 30 incorporated into the system 20 can receive one or more data elements as inputs. The processing of the match engines 30 can generate outputs that distinguish between combinations of one or more data element inputs. Match engines 30 incorporated into the processing of the system 20 can be configured in a sophisticated and highly nuanced manner sufficient to distinguish different outcomes on the basis of even a sole data element. Some embodiments of the system 20 can be implemented using a fully normalized data architecture to maximize the ability to the match engine 30 to make highly nuanced distinctions based on relatively minor differences in one or more data element. The match engines 30 utilized by the system 20 can "factor in" entity-level attributes, proposal/request-level attributes, asset-level attributes, external attributes, and virtually any other data element that the system 20 is cognizant of in identifying potentially interesting business opportunities. The match engines 30 can factor in criteria expressly provided by a particular user as well as criteria derived from past behavior, group affiliations, relationships, and other material information.

C. Data Elements

The match engine 30 can be configured to trigger processing based on potentially any single data element value or any combination of data element values. If desired, the match engine 30 can be sufficiently nuanced to generate significantly different matches based on a distinction pertaining to only a single data element.

1. Profiles and Interesting Profiles

A profile can be comprised of all the information pertaining to a particular entity that is stored by the system 20 or is otherwise accessible to the system 20 that is not limited to a specific transaction or asset. Profiles can include processing rules pertain to the disclosure of information, negotiations, prior use of the system 20. Different profiles can exist for different roles in participating in the system 20. In some embodiments of the system 20, a profile can also include historical data pertaining to an entity's past usage of the system 20. In many embodiments of the system 20, users can configure the degree to which their profiles are accessible to other users of the system 20. It is anticipated that different contexts of transactions will require different degrees of privacy protection. For example, healthcare information is entitled to special protections under HIPAA.

A profile of interest 51 (which can also be referred to as an interesting profile 51) refers to situation where an entity is searching system 20 profiles based on various search criteria to identify a subset of identities that are interesting for a particular potential transaction or category of transactions. An interesting profile 50 can also be referred to as a "shortlisted" profile (e.g. a profile that has made the latest cut in an evaluation of profiles). The system 20 can be used to perform multiple iterations of winnowing down interesting profiles 50, and the identification of interesting profiles 50 can be done in fully automated, partially automated, or fully manual manner. An interesting profile 51 can be interesting with respect to particular transaction or more generally outside the context of any potential transaction.

a. Buyer Profile

A buyer profile 34 is a profile associated with an entity's participation in the system 20 in the role of a buyer 24. The system 20 can be configured to allow a single entity to have more than one buyer profile 34.

b. Seller Profile

A seller profile 32 is a profile associated with an entity's participation in the system 20 in the role of a seller 22. The system 20 can be configured to allow a single entity to have more than one seller profile 32.

c. Broker Profile

Some embodiments of the system 20 can allow a third party to act as a broker on behalf of either a buyer 24 or a seller 22. The same entity can interact with the system 20 in the role of a broker in one context while assuming the role of a buyer 24 or seller 22 in a different context.

2. Listings and Interesting Listings

A listing 36 is a product, service, or combination of products and services offered by a seller 22. Listings 36 can include a wide range of information about the product or service. The degree to which a listing 36 is accessible to user of the system 20 is controlled by the seller 22. The greater the detail of the listing 36, the greater the value and functionality that can be provided by the match engine 30 in identifying potentially desirable transactions.

Some listings can be referred to as interesting listings 36. A seller 22 may characterize an asset that it wants to sell as an interesting listing 36, and a buyer 24 may identify an asset that it wants to buy as an interesting listing 36. The status of an interesting listing 36 can exist outside the scope of any contemplated transaction 35, proposal 44, or request 38.

3. Requests and Interesting Requests

A request 38 is a request for proposal ("RFP" or request 38) by a buyer 24. Requests 38 can be sent to a subset of sellers 22 identified by the buyer 24 and/or the match engine 30. A request 38 can be associated detailed requirements and criteria. The more detailed the request 38, the greater the value and functionality that can be provided by the match engine 30 in identifying potentially desirable transactions. A request 38 can also be associated with a detailed schedule 42 that defines the timeline for sellers 22 in responding to the request 38.

An request of interest 51 (which can also be referred to as an interesting request 51) is a request 38 that has been shortlisted by a seller 22 as being worthy of consideration.

4. Communications

The system 20 can be configured to generate, modify, transmit and store a wide range of different communications 40. Reusable communication templates can be incorporated into the system 20. Common examples of communications 40 include e-mail, instant messages, faxed letters, letters sent via conventional mail or carrier service, automated telephone calls, and text messages. Each interaction between a party such as a buyer 24 and potential transaction partners such as sellers 22 can involve automated communications 40 that provide the requisite information for moving the process forward. Communications 40 can be subject to or even automatically triggered by a schedule 42 and other applicable data elements as influenced by user preferences and processing rules.

5. Schedules

In a demand-side embodiment of the system 20, each request 38 can be associated with a schedule 42 that is set by the buyer 24. In a supply-side embodiment of the system 20, each listing 36 can be associated with a schedule 42 that is set by the seller 22. Even in a demand-side embodiment, a seller 22 could attempt to impose a schedule 42 for subsequent follow-up activities by the buyer 24, but the buyer's 24 acquiescence would be required to give impact to the seller's schedule 42 (i.e. the buyer 24 could decide to ignore the seller's schedule 42 or decide to eliminate the seller 22 from consideration as a result of the seller's attempt to impose a schedule 42 on the buyer 24).

6. Proposals and Interesting Proposals

A proposal 44 is a response to a request 38. In some embodiments, a single proposal 44 can be associated with multiple sellers 22. In other embodiments, a single proposal is limited to a single seller 22. In addition to providing certain transaction-specific information in response to the request 38, a proposal can also include one or more asset listings 36 by the seller 22. The system 20 can be configured by sellers 22 to provide for the partially automated or even the fully automated generation and transmission of proposals 44.

A proposal of interest 46 (which can also be referred to as an interesting proposal 46) is a proposal that has been shortlisted by a buyer 24 with respect to a particular request 38. In a supply-side embodiment of the system 20, proposals 44 and interesting proposals 46 constitute the primary mechanism for initiating transaction-specific processing through use of the system 20.

7. Groups

Different embodiments of the system 20 can provide users with a variety of different capabilities to create and join public and private groups 48. Eligibility for various groups 48 can be determined based on information accessible in an entity's profile 34 or on more subjective factors. Groups 48 can include sub-groups. Membership in a group 48 can be a material factor in the selection of a particular buyer 24 or seller 22 in the automated processing of the system 20. Groups 48 can create rules that apply to processing rules for group members. Groups 48 can implement a variety of different criteria for determining membership eligibility.

8. Relationships

A relationship 47 is an attribute relating two entities, such as a particular connection between a buyer 24 and a seller 22. A relationship 47 can comprise past transactions, a positive review (e.g. a recommendation), a negative review (e.g. a critique), common group 48 affiliations, etc. Relationships 47 can be an important distinguishing factor for the match engine 30. Some relationships 47 can be subject to dual verification. For example, the system 20 can be configured so that one entity cannot list another entity as an "associate" without the affirmative consent of both entities. In other embodiments of the system 20, relationships 47 can be designed based on historical or otherwise objective information. Different embodiments of the system 20 can accommodate a wide variety of different methodologies for defining, updating, and giving importance to relationships 47.

9. Transactions

A transaction 35 is an exchange of consideration between two or more parties, including at least one buyer 24 and at least one seller 35. In many embodiments of the system 20, each request 38 pertains to at least one potential transaction. In other embodiments, requests 38 can be generic requests for information. To facilitate future processing by the system 20, the system 20 can configured to store historical data pertaining to past transactions 35 originating through use of the system 20. In some embodiments of the system 20, the final negotiation and consummation of a transaction 35 occurs within the system 20 itself. In other embodiments, the actual finalization and execution of a contract occurs outside system 20 processing using more traditional means. In either situation, the system 20 can be used to archive a copy of the agreement and to place contractual requirements on the applicable schedule 42. The data elements processed by the system 20 to facilitate a transaction 35 can also be used by the system 20 to facilitate management of contractual requirements after the execution of a transaction 35.

10. Statuses

Figure 2:
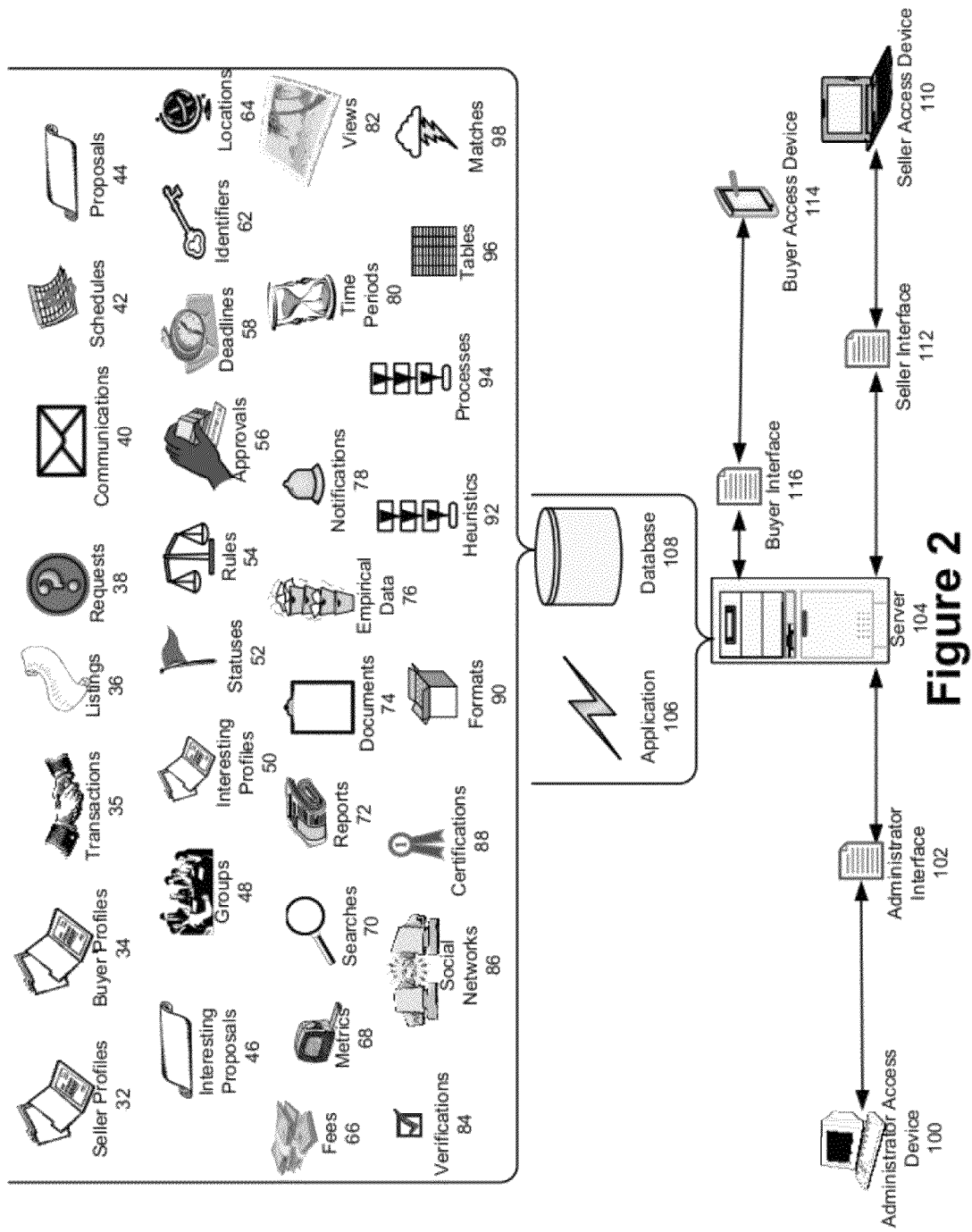
FIG. 2 is a block diagram illustrating an example of different technical components, access devices, user interfaces, and data elements that can be incorporated into the system.

FIG. 2 is a block diagram that illustrates additional examples of data elements that can be incorporated into the processing of the system 20. A status 52 or a change in status 52 can constitute a triggering event for automated processing by the system 20. For example, a request 38 may be open or closed, a listing 36 could be active or inactive, a proposal 44 could be successful or unsuccessful, a deadline 58 could be met or missed, etc. Virtually any process or data element can be associated with a status 52. For example, if a request 38 sets forth certain information disclosure requirements, the status of a responding proposal 44 will be incomplete until the requirements are satisfied, upon which the status 52 will change to complete. Such a status 52 may trigger various notification communications 49 as well as various heuristics to analyze the desirability of the proposal 44.

11. Rules

A rule 54 is a processing rule defined on the system 20 by a particular entity. In different contexts, the processing rules 54 of different entities will control in the case of a conflict. For example, the information disclosure rules 54 of an entity can be configured to take precedence over any conflicting rule. However, the inability of other entities to access expected information may make the prospect of proceeding to a transaction unlikely. Rules 54 allow entities to configure their usage and participation in the system 20 according to their business practices. If a buyer 24 and a seller 22 configure mandatory rules 54 that are incompatible with those of the other party, the system 20 will not be able to facilitate a transaction 35 between those parties.

12. Approvals

An approval 56 is an affirmation of consent embodied in the system 20. The system 20 can incorporate a variety of authentication processes and technologies to document approvals 56. For example, in some embodiments of the system 20, the system 20 provides contractual parties with the ability to execute a contract within the system 20 itself, using one of a variety of electronic signatures signifying the approval 56 of the signing party. A schedule 42 associated with a request 38 may involve several stages that require the buyer's 24 approval 58 for a particular proposal 44 to remain under consideration. Examples of approvals 56 can include designating an entity to act as a broker for a particular transaction 35, agreeing to a proposed modification to a schedule 42 or requirement in a request 38, etc.

13. Deadline

A deadline 58 is a due date on a schedule 42. The passing of a deadline 58 can trigger a change in status 52. An upcoming deadline 58 can trigger notification communications 40. In a demand-side embodiment of the system 20, each request 38 will be associated with various deadlines 58 for responsive proposals 44 and other follow-up requirements for information.

14. Identifier

An identifier 62 is a unique token that can be used to ascertain the identity of an entity. The system 20 can support the use of identifiers 62 that allow the system 20 to act upon the correct identity of the entity (such as by performing automated processes based on the profile of the entity) without revealing the identity of the entity.

15. Locations

A location 64 is a geographical designation that can be associated with an entity, a particular listing 36, or other data elements processed by the system 20. In the context of a system 20 for commercial real estate transactions, the location 64 data element is often a critical element to the transaction 35. The location 36 of an asset can be very important even if the asset is movable.

16. Fees

A fee 66 is a monetary payment made pursuant to a transaction 35. Fees 66 can be made in accordance to an applicable schedule 42. The payment of a fee 66 can trigger a change in status 52.

17. Metrics

A metric 68 is a measurement that the system 20 is cognizant of. The match engine 30 can base the desirability of a particular profile, request 38, proposal 44, listing 36, group 48, or relationship 47 on the basis of one or more metrics 68. Metrics 68 can be captured or imported into the system 20. For example, external financial data can include a wide variety of metrics 68 that can be used to influence the processing of the system 20.

18. Searches

A search 70 is a criteria-based inquiry of one or more databases 108 used by the system 20. Searches 70 can be fully automated, fully manual, or partially automated. Searches 70 can also be augmented by the processing rules and the "intelligence" of the system 20.

19. Reports

A report 72 is a collection of data organized and generated by the system 20. The generating of reports 72 is often tied to schedules 42, approvals 56, statuses 52, and metrics 68. Reports 72 can be re-occurring or ad hoc, based on templates or fully customized, etc.

20. Documents

A document 74 is form that displays information in a particular format 90. Documents 74 are capable of being approved 56 and stored on the system 20. Documents 74 can be incorporated into the system 20 to accommodate legal requirements or corporate policies that require the use of a particular document 74 in certain transactions 35.

21. Empirical Data

The system 20 can be configured to capture, store, and access a wide range of different empirical data 76. Empirical data 76 can include the history of a particular entity with regards to the system 20 as well as data from sources external to the system 20, such as the inflation rate, price of gold, value of the U.S. dollar, etc. Empirical data 76 can enhance the functionality of the match engine 30.

22. Notifications

A notification 78 is a communication 40 of a particular event that the system 20 is cognizant of. A common example of a notification 78 is an e-mail triggered by change in status 78.

23. Time Periods

A time period 80 is a pre-defined passage of time. A schedule 42 can be defined in terms of time periods 80 and deadlines 58.

24. Views

A view 82 is a particular perspective of data that the system 20 is cognizant of. Different interfaces used by the system 20 can provide a variety of different views 82 of system processing.

25. Verifications

A verification 84 is a confirmation of a fact or status 52 made through the system 20. Verifications 84 can be manual or automated.

26. Social Networks

The system 20 can incorporate and/or integrate a variety of different social networks 86 to facilitate interactions between entities outside the scope of a particular transaction 35.

27. Certifications

Some embodiments of the system 20 may include their own certifications 88. For example, the system 20 could issue certifications 88 to sellers 22 with more than a certain financial value of inventory, brokers with more than 1 year of history with the system 20, etc.

28. Formats

Data stored by the system 20 can be displayed in a wide variety of formats. Different entities can create, store, access, update, and use reusable formats to conduct their business using the system 20. For example, a buyer 24 could create certain types of reusable formats 90 for requests 38 involving a particular type of asset.

29. Heuristics

A heuristic 92 is a problem solving process by which an appropriate solution is found through the use of alternative methods at different successive stages of the problem solving process. The system 20 can incorporate a wide range of different heuristics that pertain to identifying interesting profiles 50, interesting requests 51, interesting proposals 46, matching buyers 24 and sellers 22 through different combinations of transaction-based and entity-based attributes, etc.

30. Processes

A process 94 is a sequence of actions made in accordance with a predefined set of instructions. Many rules 54 in the system 20 define processes 94 performed by the system 20.

31. Tables

A table 96 is a type of data format 90 that involves rows and columns.

32. Matches

A match 98 is the output generated by a heuristic 92 or process 94 performed by the system 20 to identify a subset of interesting data points from a larger library of data.

D. Information Technology Components

FIG. 2 also illustrates an example of different information technology components that can be incorporated into the system 20.

1. Access Devices

An access device is potentially any device capable of communicating with another device. Examples of access devices include desktop computers, laptop computers, cell phones, personal digital assistants (PDAs), embedded computer devices, smart TVs, satellite pagers, telephone numbers with voice recognition technologies, mainframe computers, tablet computers, etc. Just as entities can have various roles in the system 20, so can access devices.

a. Administrator Access Device

An administrative access device 100 is an access device used by an administrator for the system 20.

b. Buyer Access Device

A buyer access device 114 is an access device used by a buyer 24 to interact with the system 20.

c. Seller Access Device

A seller access device 110 is an access device used by a seller 22 to interact with the system 20.

2. Interfaces

Common examples of user interfaces are that of a web page accessed by a browser or a graphical user interface used on a desktop computer. Interfaces are influenced by factors such as the operating system, the access device, and the application 106.

a. Administrator Interface

An administrative interface 102 is an interface used by an administrator for the system 20.

b. Buyer Interface

A buyer interface 116 is an interface used by a buyer 24 to interact with the system 20.

c. Seller Interface

A seller interface 112 is an interface used by a seller 22 to interact with the system 20.

3. Server

A server 104 is a computer used to host one or more software applications 106 that provide for the functionality of the system 20 as well as the one or more databases 108 used by the system 20 to store and access data. The system 20 can use a variety of different interconnected servers 104.

4. Application

An application 106 is a computer program used to support the functionality of the system 20. The system 20 can incorporate one or more different applications 106. Applications 108 can be written in a wide variety of different programming languages, although in many embodiments an object-oriented programming language or a 4GL programming language will be desirable.

5. Database

One or more databases 108 can be used by the system 20 to store, access, update, and delete data. The system 20 can incorporate a wide variety of different databases 108, including but not limited to relational SQL databases, object-oriented databases, hierarchical databases, and other storage methodologies.

III. Architecture View

Figure 3:
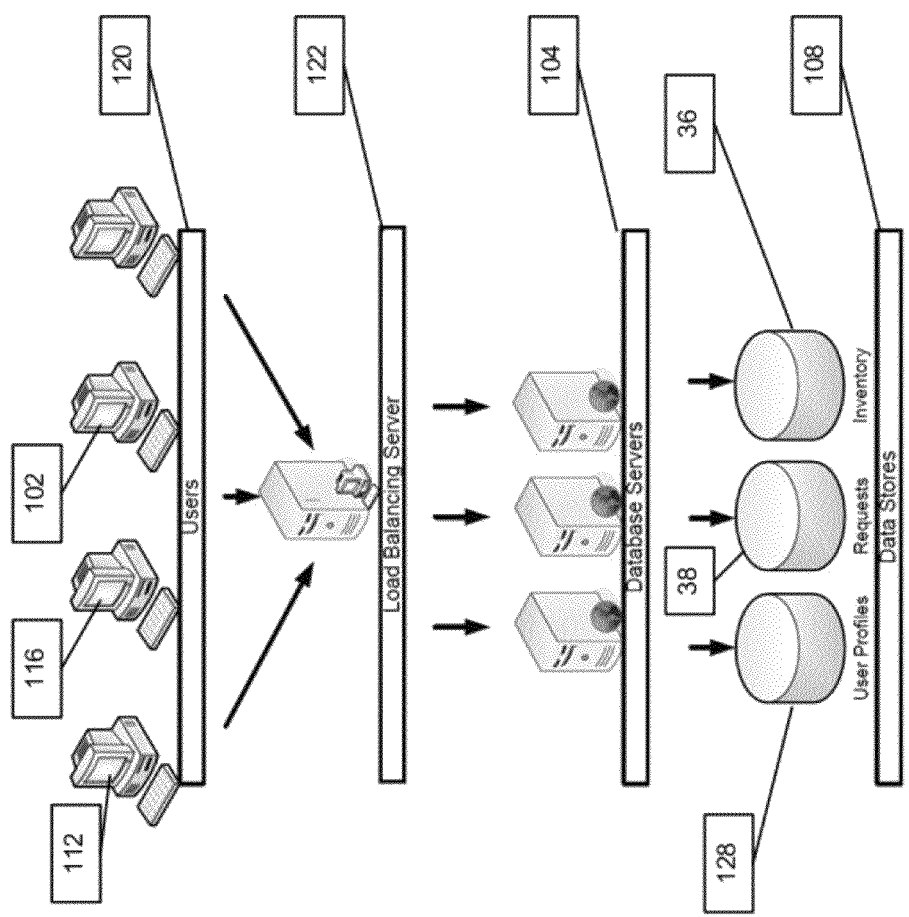
FIG. 3 is a schematic block diagram illustrating an example of the information technology infrastructure that can be used to support the processing of the system.

FIG. 3 is a schematic block diagram illustrating an example of an information technology infrastructure configuration that can be used to support the processing of the system 20. An individual user 120 accesses the system 20 through an interface, such as seller interface 112, a buyer interface 116, or an administrator interface 102. The traffic of the system 20 can be controlled using one or more load balancing servers 122 which direct users 120 to the system databases 108 residing on database servers 104, storing such information as user profiles 128, requests 38, inventories of listings 36, and other data elements used by the system 20.

IV. Subsystem Views

The system 20 can be described in terms of subsystems organized in a variety of different configurations that interact with each other.

A. Subsystem Configuration #1

Figure 4B:
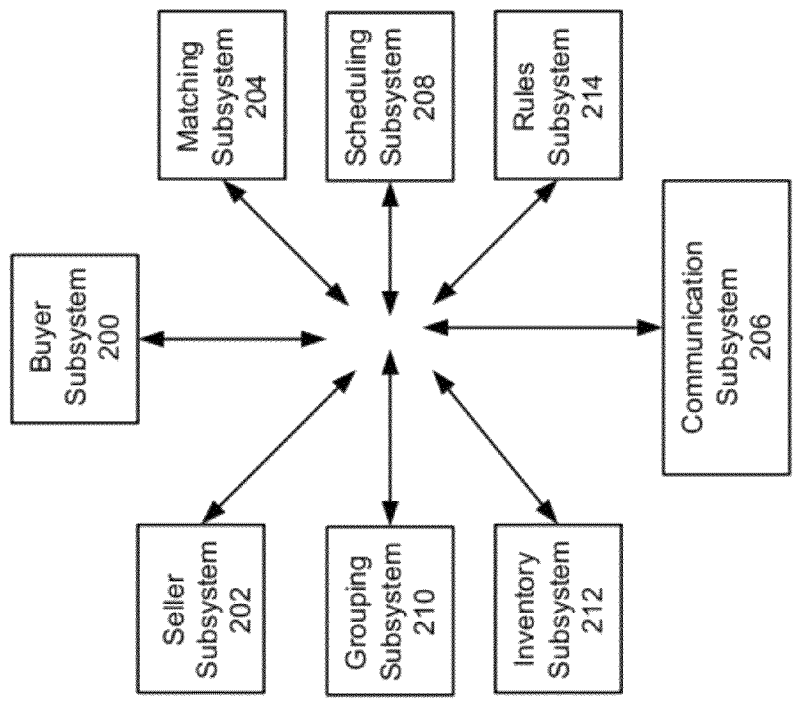
FIG. 4b is a block diagram illustrating an example of a subsystem-level view of the system that includes a buyer subsystem, a seller subsystem, a matching subsystem, a communication subsystem, a scheduling subsystem, a grouping subsystem, an inventory subsystem, and a rules subsystem.
Figure 4A:
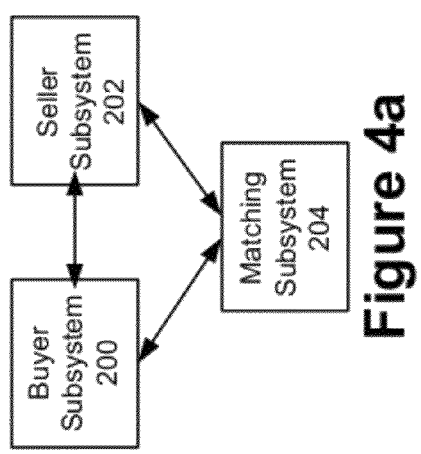
FIG. 4a is a block diagram illustrating an example of a subsystem-level view of the system that includes a buyer subsystem, a seller subsystem, and a matching subsystem.

FIG. 4a is a block diagram illustrating one example of a subsystem configuration that can be incorporated into the system 20.

1. Buyer Subsystem

A buyer subsystem 200 can be used by buyers 24 for virtually all interactions between the buyer 24 and the system 20. The buyer subsystem 200 can be used to perform a wide range of different functions including but not limited to the following: create buyer profiles 34; define relationships 47 pertaining to the buyer 24; join and create groups 48; create requests 38; transmit requests 38 to selectively identified sellers 22; identify criteria for interesting seller profiles; define schedules 42 and processing rules for a particular request 38; generate communications 40; view and evaluate proposals 44; change statuses 52; issue approvals 56; set deadlines 58; create identifiers 62 to facilitate anonymous interactions with the system 20; identify desirable seller attributes including a desired seller category, a location, and a specialty; pay and/or receive fees 66; perform searches 70; define, view, and analyze various metrics 68; perform searches 70; define, generate, and analyze reports 72; create and store documents 74; access and view empirical data 76; send and receive notifications 78 and other forms of communications 40; create and use different data views 82; participate in social networks 86; perform verifications 84; issue and receive certifications 86; define, store, and utilize different data formats 90; define and invoke different heuristics 92 and other processes 94; organize information into tables 96; and save and analyze various matches 98 identified both manually and through the processing of the system 20.

2. Seller Subsystem

A seller subsystem 202 can be used by sellers 22 for virtually all interactions between the seller 22 and the system 20. The seller subsystem 202 can be used to perform a wide range of different functions including but not limited to the following: create seller profiles 32; define relationships 47 pertaining to the seller 22; join and create groups 48; view and analyze requests 38; identify criteria for interesting buyer profiles 34; define schedules 42 and processing rules for a particular proposal 44; generate communications 40; view and evaluate requests 48; change statuses 52; issue approvals 56; set deadlines 58; create identifiers 62 to facilitate anonymous interactions with the system 20; identify desirable buyer attributes including a desired buyer category, a location, and a specialty; identify desirable request 38 attributes; pay and/or receive fees 66; perform searches 70; define, view, and analyze various metrics 68; perform searches 70; define, generate, and analyze reports 72; create and store documents 74; access and view empirical data 76; send and receive notifications 78 and other forms of communications 40; create and use different data views 82; participate in social networks 86; perform verifications 84; issue and receive certifications 86; define, store, and utilize different data formats 90; define and invoke different heuristics 92 and other processes 94; organize information into tables 96; and save and analyze various matches 98 identified both manually and through the processing of the system 20.

3. Matching Subsystem

A matching subsystem 204 can be used to identify data this is "interesting." For example, the matching subsystem 204 can assist buyers 24 in short listing proposals 44 and sellers 22 in short listing requests 38. The matching subsystem 204 includes the match engine 30 and all of the various heuristics 92 and processes 94 that can be used to evaluate information. Buyers 24 interact with the matching subsystem 204 through the buyer subsystem 200 and sellers 22 interact with the matching subsystem 204 through the seller subsystem 202.

B. Subsystem Configuration #2

FIG. 4b is a block diagram illustrating another example of a subsystem configuration that can be incorporated into the system 20.

1. Buyer Subsystem

The buyer subsystem 200 is described above. As discussed above, the buyer subsystem 200 is the mechanism by which buyers 24 interact with the other subsystems. The buyer subsystem 200 includes the buyer interface 116.

2. Seller Subsystem

The seller subsystem 202 is described above. As discussed above, the seller subsystem 202 is the mechanism by which sellers 22 interact with the other subsystems. The seller subsystem 202 includes the seller interface 112.

3. Matching Subsystem

A matching subsystem 204 is described above. Only the administrator interfaces 102 provide for direct access to the matching subsystem 204. Buyers 24, sellers 22, and brokers can only interact with the matching subsystem 204 indirectly.

4. Communication Subsystem

A communication subsystem 206 can be used to create, store, transmit, receive, and schedule communications 40, including but not limited to the distribution of requests 38 to selectively identified sellers 22 on the basis of seller profiles 32, proposals 44 sent in response to requests 38, automated notifications 78 generated in response to status 52 changes, transmitting a wide range of both customized and standardized reports 72, interacting with social networks 86, and communicating certifications 88. The communications 40 of the communication subsystem 206 can be scheduled in accordance with the scheduling subsystem 208, use group 48 and other relationship 47 affiliations in accordance with the grouping subsystem 210, and provide listing 36 (e.g. asset) information in accordance with the inventory subsystem 212. Different entities can define different rules 54 regarding their use of the communication subsystem 208. For example, in some instances a buyer 24 may want to use automated communications 40 for the first round of short listing various proposals 44 with respect to a particular transaction 35 while in other instances, rely on manual communications 40.

5. Scheduling Subsystem

A scheduling subsystem 208 can be used to create, store, update, and enforce schedules 42. The scheduling subsystem 208 can associate a deadline 58 or a time period 80 with virtually any other data element processed by the system 20. Schedules 42 can be "mandatory" or "suggestive" depending on the context.

6. Grouping Subsystem

A grouping subsystem 210 can used to create and join various groups 48 and subgroups. The grouping subsystem 210 can also be used to define and store relationships 47 that can have a significant impact on the matches 98 identified by the match engine 30.

7. Inventory Subsystem

An inventory subsystem 212 consists of all the listings 36 on the system 20. In addition to the creation or uploading of an individual asset listing 36, some embodiments of the inventory subsystem 212 can be used by sellers 22 to manage their aggregate inventories and by buyers 24 to make assessments about sellers 22 based on a seller's aggregate inventory.

8. Rules Subsystem

A rules subsystem 214 is where rules are created, updated, and enforced. The rules 54 of the system 20 determine how overlapping and even contradictory rules 54 are reconciled.

V. Process Flow Views

The system 20 can be implemented in a wide variety of different ways using a wide variety of different configurations. In many instances, it will be desirable to give each individual entity as much ability as possible to customize their use of the system 20 because such customizations make use of the system 20 more desirable, and allow entities to more fully benefit from the possibility of automating processes 94 using the system 20.

A. Process View #1

FIG. 5*a* is flow chart diagram illustrating an example of a process by which a seller 22 can utilize the system 20 to consummate a transaction 35. The example is of a demand-side embodiment of the system 20.

At 300, the user creates a seller profile. Various aspects of the profile can be associated with different privacy settings such as private, restricted, or public.

At 302, the seller 22 creates, uploads, or otherwise enters a listing 36 onto the system 20. As the illustration is of a demand-side embodiment, the seller 22 is focused on inventory management activities with respect to the processing of the system 20 until a request 38 is received. Requests 38 can be viewed and analyzed using the system 20.

At 304, the seller 22 responds to the request 38, placing the impetus for action back on the buyer 24.

At 306, the seller 22 engages in a variety of follow-up activities (including the negotiation of a binding contract), and then at 308 the transaction is consummated.

B. Process View #2

FIG. 5*b* is a flow chart diagram illustrating an example of a process by which a seller 22 can utilize the system to consummate a transaction 35.

At 310, a seller profile is created.

At 310, the seller 22 logs in to the system 20.

At 314, the seller 22 defines various rules pertaining to the seller's interactions and participation on the system 20.

At 316, the seller 22 can join or create various groups.

At 318, the seller 22 can define various relationships that may be of interest to buyers 24, brokers, or even other sellers 22. Such relationships can in some instances, be independently authenticated by other parties through use of the system 20.

At 320, listings 36 are either created or uploaded into the system 20.

At 322, the seller 22 searches through received or otherwise applicable requests by various buyers 24.

At 324, the seller 22 selects an active request.

At 326, the seller 22 views the selected active request.

At 328, the seller 22 analyzes the request, an activity that can be facilitated by the various ways in which the seller 22 defines rules and otherwise configures the system 20.

At 330, the seller 22 responds to the request by sending a proposal that typically identifies one or more listings 36 associated with the seller 22.

At 332, the seller 22 schedules follow-up activities pertaining to the request and/or proposal.

At 334, the seller 22 can engage in a variety of follow-up activities with the buyer 24.

At 336, the seller 22 consummates a transaction 35 with the applicable buyer 24.

C. Process View #3

FIG. 5*c* is a flow chart diagram illustrating an example of a process by which a buyer 24 can utilize the system 20 to consummate a transaction 35.

At 340, the buyer 24 creates a buyer profile on the system 20.

At 342, the buyer 24 creates a request 342. As discussed above, the request can be associated with other data elements such as schedules, deadlines, privacy rules, etc.

At 344, the buyer 24 identifies potential recipients for the request 342. This selective identification process can be fully automated, fully manual, or partially automated. A wide variety of different criteria pertaining to various data elements of which the system 20 is cognizant can be used to facilitate the selective identification of potential recipients for the request.

At 346, the request is communicated to the desired recipients 246,

At 348, the buyer 24 can initial follow-up activities with some or all of the desired recipients.

D. Process View #4

FIG. 5*d* is a flow chart diagram illustrating an example of a process by which a buyer 24 can utilize the system 20 to consummate a transaction 35.

At 350, the buyer 24 creates a buyer profile 350 to participate in the system 20.

At 352, they buyer 24 logs in to the system 20.

At 354, the buyer 24 defines certain rules 354, which can include mere preferences, such as desired locations, desired seller and inventory attributes, etc.

At 356, the buyer 24 can join or create various groups.

At 358, the buyer 24 can identify relationships that may be of interest or value to potential sellers or even other buyers 24.

At 360, the buyer 24 can create a request and various parameters accompanying the request, such as a schedule, criteria for evaluation proposals, etc.

At 362, the buyer 24 can define criteria for selectively identifying recipients of the request.

At 364, the buyer 24 can identify the desired recipients through fully automated, fully manual, or partially automated means.

At 366, the request can be communicated to the desired recipients though the system 20. If desired, automated notifications (to recipients) and automated receipt confirmations (to the buyer 24) can also be generated by the system 20.

At 368, the buyer 24 can receive, view, and analyze proposals sent in response to the request. As discussed above, a wide variety of automated analytical tools can be employed by the buyer 24.

At 370, the buyer 24 can engage in various follow-up activities 370 with the shortlisted sellers 22.

At 372, the transaction 35 can be consummated.

At 374, updates to the historical data of the system 20 can be made subject to the rules (privacy and otherwise) of the involved parties.

E. Process View #5

Figure 5E:
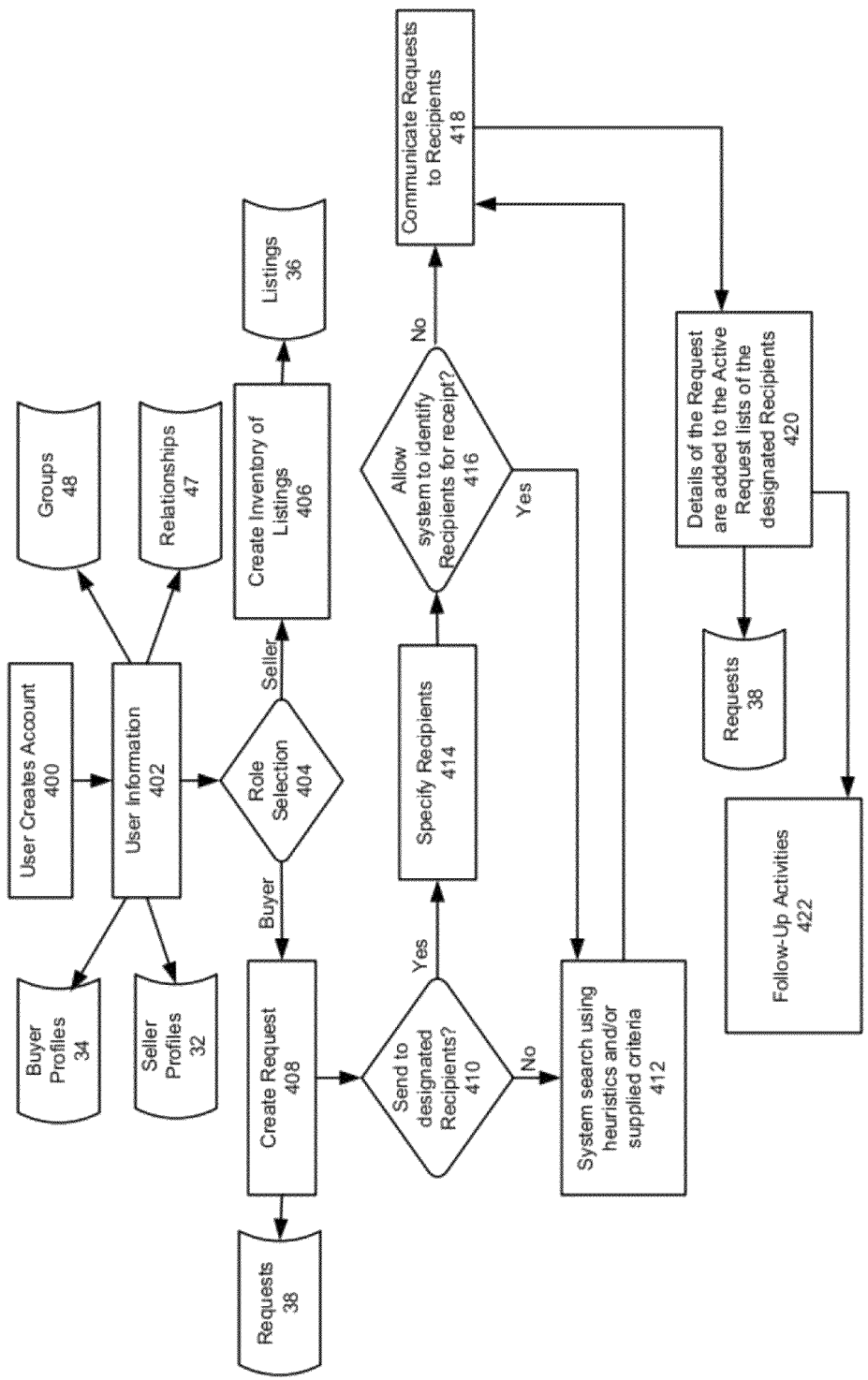
FIG. 5e is a flow chart diagram illustrating an example of a process by which a buyers and sellers can interact with each other.

FIG. 5*e* is a flow chart diagram illustrating an example of a process by which a buyers 24 and sellers 22 can interact with each other.

At 400 the user creates an account with the system 20.

At 402, the user inputs information into the system. This information is used to create profiles such as buyer profiles 34 and seller profiles 32. Information pertaining to groups 48 and relationships 47 can also be entered.

At 404, the user then selects a role for their subsequent activity. A new user selecting the role of a seller 22 will then create an inventory of listings 36 at 406 to be used in responding to subsequent requests 36. In a demand-side embodiment of the system 20, a seller 24 typically waits to be pinged by a request 38 from a buyer 24.

A new user selecting the role of a buyer 24 will then create a request 38 at 408. At 410, the user decides whether or not to send the request 38 to a specific list of designated recipients at 414 or to use criteria and/or the match engine 30 of the system 20 to selectively identify recipients at 412. Even if the user selects to define a specific list of recipients at 410, the system 20 can still prompt the user at 416 to augment the list using the match engine 30.

At 418, the request 38 is communicated to the applicable recipients in accordance with the rules associated with the request.

At 420, the details of the request are added to the list of active requests on the dashboard of the buyer interface for the buyer sending out the request.

At 422, the buyer can initiate a variety of different follow-up activities, including waiting for recipients of the request to respond with proposals.

F. Process View #6

Figure 5F:
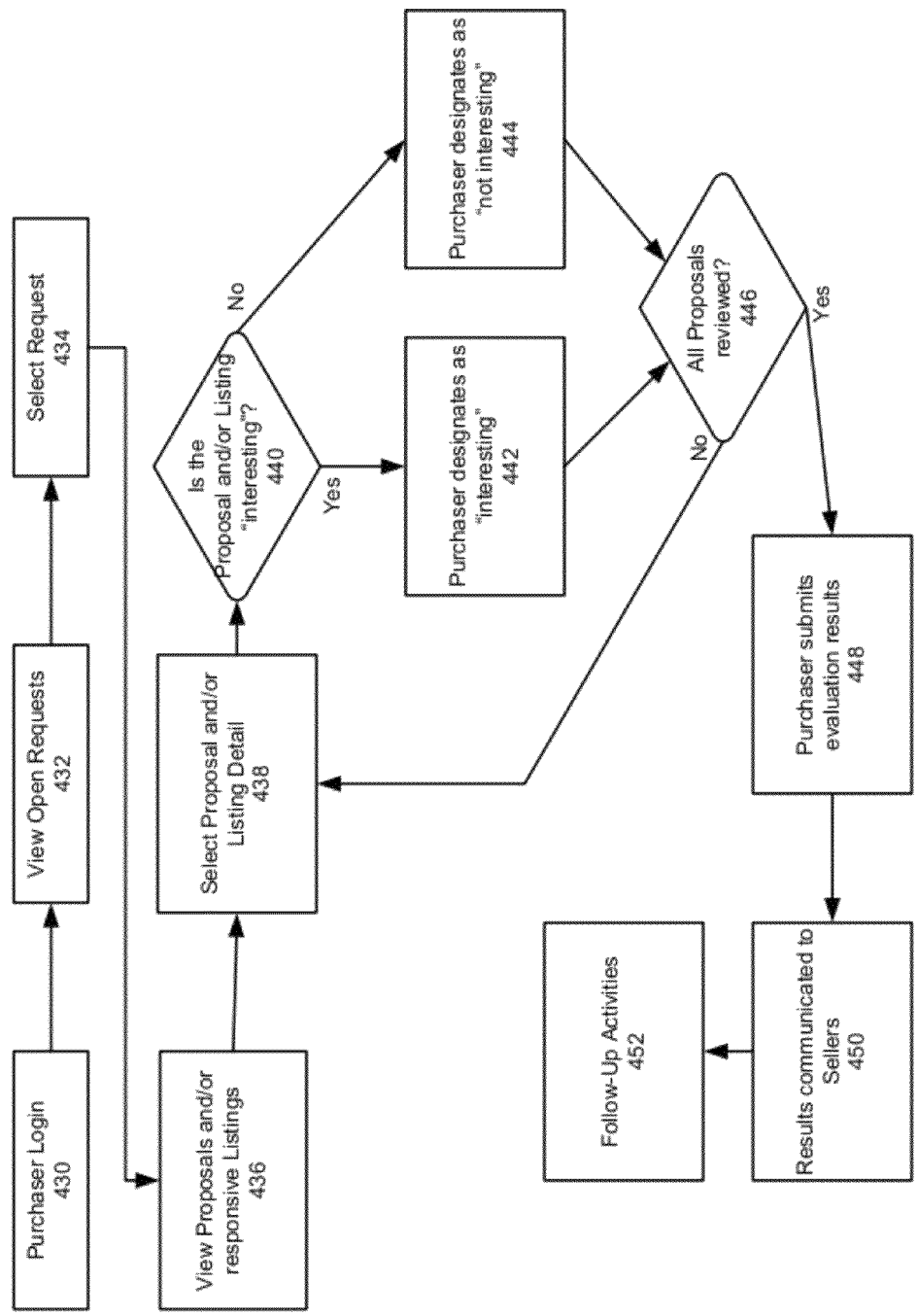
FIG. 5f is a flow chart diagram illustrating an example of a process by which a buyer can manage proposals from sellers in response to a request from the buyer.

FIG. 5*f* is a flow chart diagram illustrating an example of a process by which a buyer 24 can manage proposals from sellers 22 in response to a request 38 from the buyer 24.

At 430, the buyer 24 logs into the system 20.

At 432, the buyer 24 opens active requests 432.

At 434, the buyer 24 selects an individual request 434.

At 436, the buyer 24 can view one or more responsive proposals and/or asset listings sent by sellers 22 in response to the request.

At 438, the buyer 24 selects a proposal for viewing. This can include a more detailed view of one or more asset listings.

At 440, the buyer 24 evaluates the proposal and/or individual asset listings to determine whether or not they are "interesting" to the buyer 24. This can be done through fully automated means, fully manual means, or partially automated means as discussed above.

If the response is deemed interesting then the system designates the response as such at 442, otherwise the response is deemed not interesting.

If some proposals remain yet to be evaluated at 446, the process can return to 438. Otherwise, the buyer 24 can submit the evaluation results at 448 in accordance with the applicable rules pertaining to the particular request 38.

At 450, those results are then communicated to the applicable sellers 22.

At 452, the buyer 24 can then engage in a wide variety of different follow-up activities with the shortlisted proposals.

G. Process View #7

Figure 5G:
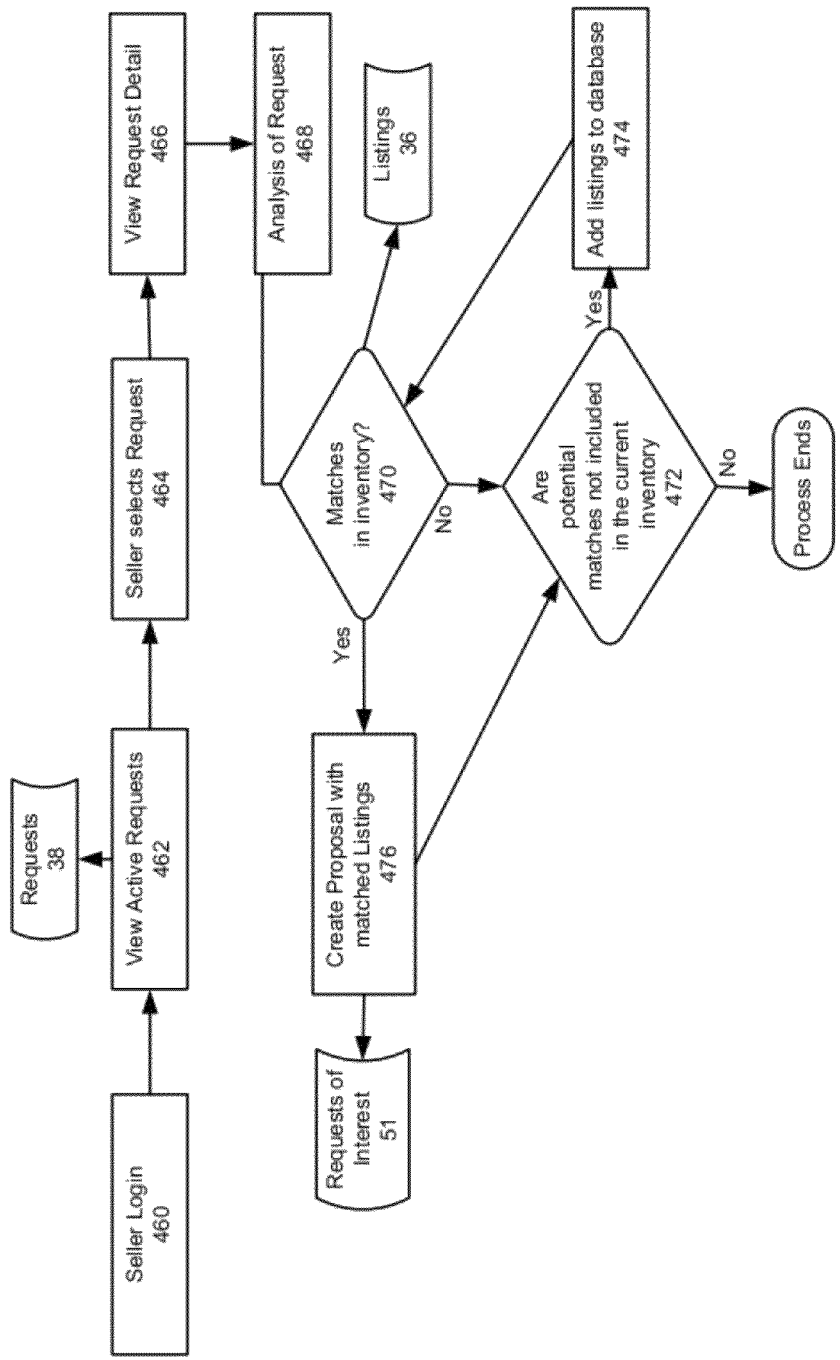
FIG. 5g is a flow chart diagram illustrating an example of a process by which a seller uses the system to match listings of assets of inventory to requests by buyers.

FIG. 5*g* is a flow chart diagram illustrating an example of a process by which a seller 22 uses the system 20 to match listings 36 of assets of inventory to requests 38 by buyers 24.

At 460, the seller logs in to the system 20.

At 462, the seller views active requests 38.

At 464, the seller selects a particular request.

At 466, the seller views the details of the selected request.

At 468, the seller analyzes the request. This can include fully automated, fully manual, or partially automated processing that involves the match engine.

At 470, the seller determines whether or not there is a suitable match in the inventory of asset listings. This can include fully automated, fully manual, or partially automated processing that involves the match engine 30. If a suitable match exists in inventory at 470, the seller 22 can create a proposal with the matched listing.

If no match exists at 470, the seller 22 can determine at 472 whether potential matches exist, but have not yet been added to the inventory on the system 20. If such potential matches exist, they can be added at 474.

VI. Interface Views

As illustrated in FIG. 2, a variety of different user interfaces can be used by users and administrators to interact with the system 20. Those interfaces will in many embodiments distinguish between different users of the basis of the "role" in which they are currently engaging the system 20. The appearance of the interface can also be significantly influenced by the processing rules defined with respect to the particular user entity and the context of the use.

The screens discussed below and illustrated in FIGS. 6*a*-6*bb* are examples of interface views that can be incorporated into the operation of the system 20. With respect to the illustrations in FIGS. 6*a*-6*bb*, the system is a demand-side embodiment of a system 20 used to facilitate commercial real estate transactions between buyers 24 and sellers 22. The discussion below walks through a sequence of events illustrating the interface views encountered by a buyer 24 in the matching process.

Figure 6A:
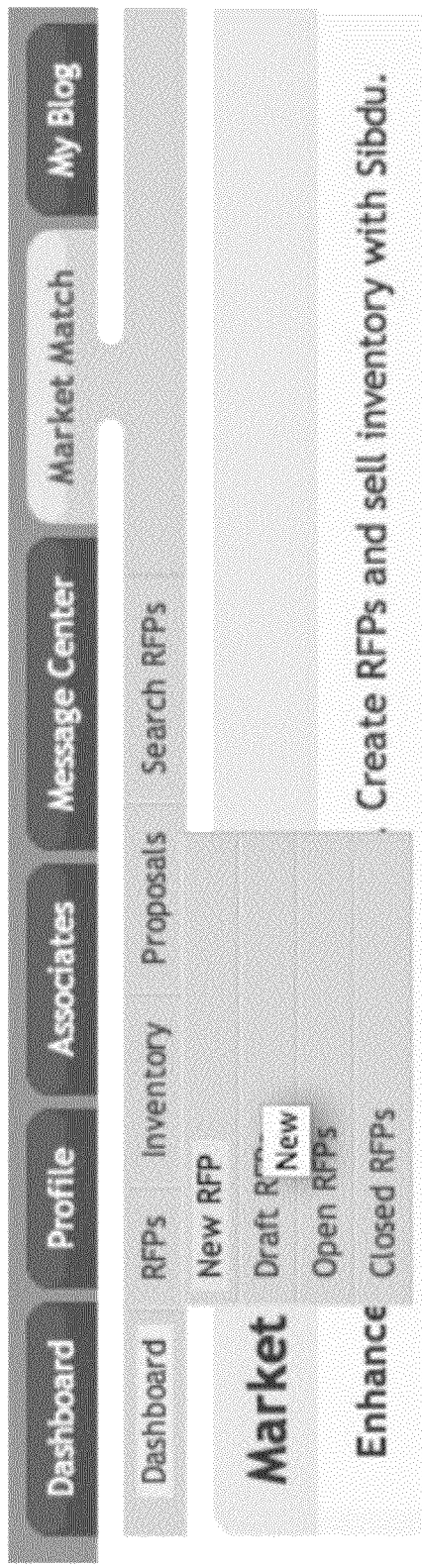
FIG. 6a is an interface view illustrating an example of a screen that can be used to create a new request on the system (i.e. start or being a new request).

FIG. 6*a* is an interface view 82 illustrating an example of a screen that can be used to create a new request 38 on the system (i.e. start or being a new request).

FIG. 6*b* is an interface view 82 illustrating an example of a screen that can be used to create or modify a request 38. This is a screen that can be used to define the various requirements and other data elements that are associated with the request 38.

Each request 38 that is broadcasted (i.e. communicated or transmitted) through the system 20 is subject to certain accessibility parameters set by the buyer 24. FIG. 6*c* is an interface view illustrating an example of a screen that can be used to define whether or not a particular request 38 is accessible to the public at large via a search 70 of the system 20 The demand side participant (e.g. the buyer 24) can use the screen to make a particular request 38 accessible to public searches 70.

Figure 6D:
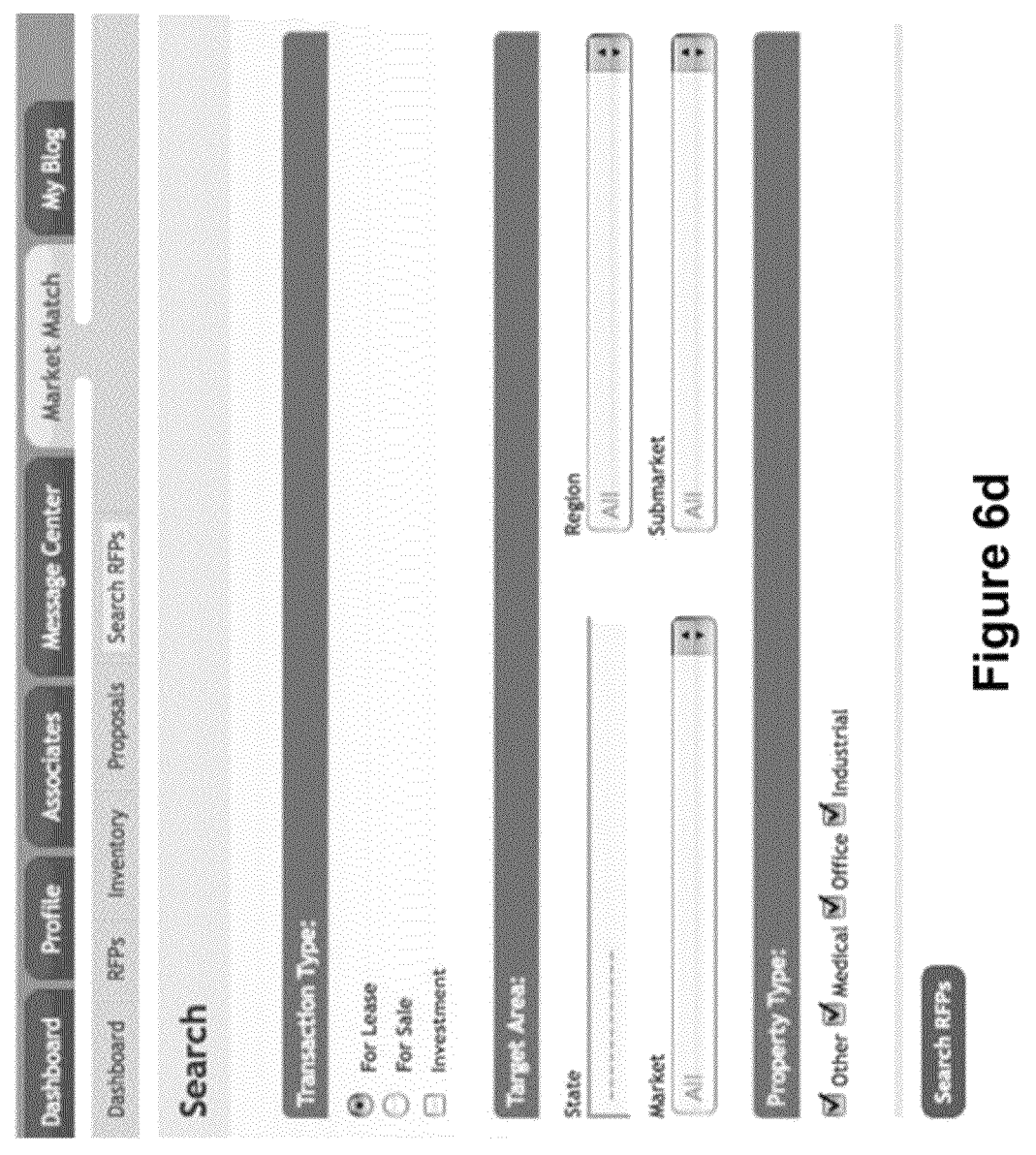

FIG. 6*d* is an interface view 82 illustrating an example of a screen that can be used to facilitate matches with other parties through a search 70 in which the user defines the parameters for the search. The system 20 can be used to support buyers 24 searching for sellers 22 and other relevant attributes and to support sellers 22 searching for buyers 24 and other relevant attributes. Different embodiments of the system 20 can provide for reusable search criteria for both sellers 22 and buyers 24.

FIG. 6*e* is an interface view 82 illustrating an example of a screen that can be used to select specific recipients for a seller request 38. As illustrated in the drawing, distribution of a particular request 38 can be limited to expressly identified recipients.

Figure 6F:
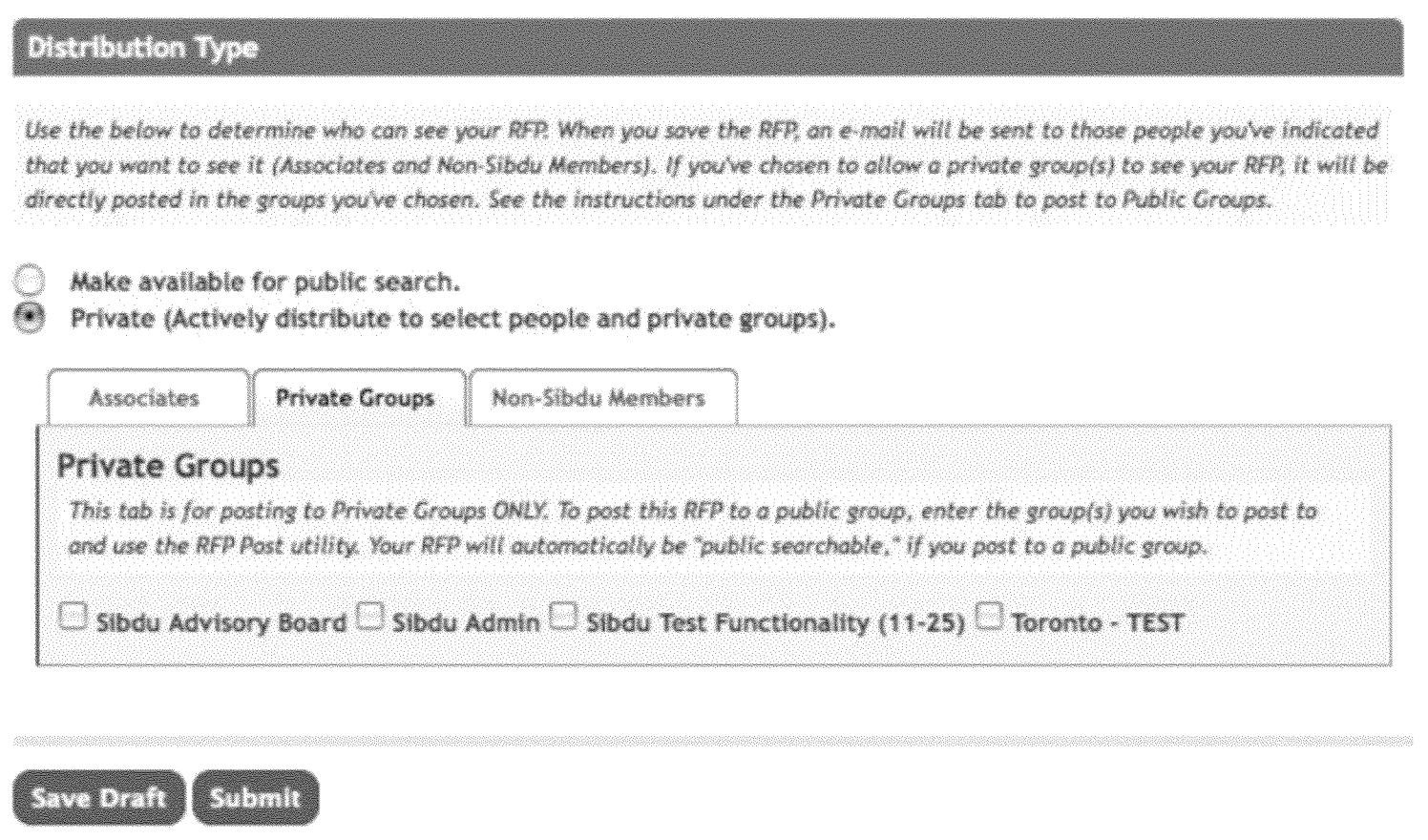

FIG. 6*f* is an interface view 82 illustrating an example of a screen that can be used to select recipients for a seller request 38 on the basis of group 48 affiliations.

Figure 6G:
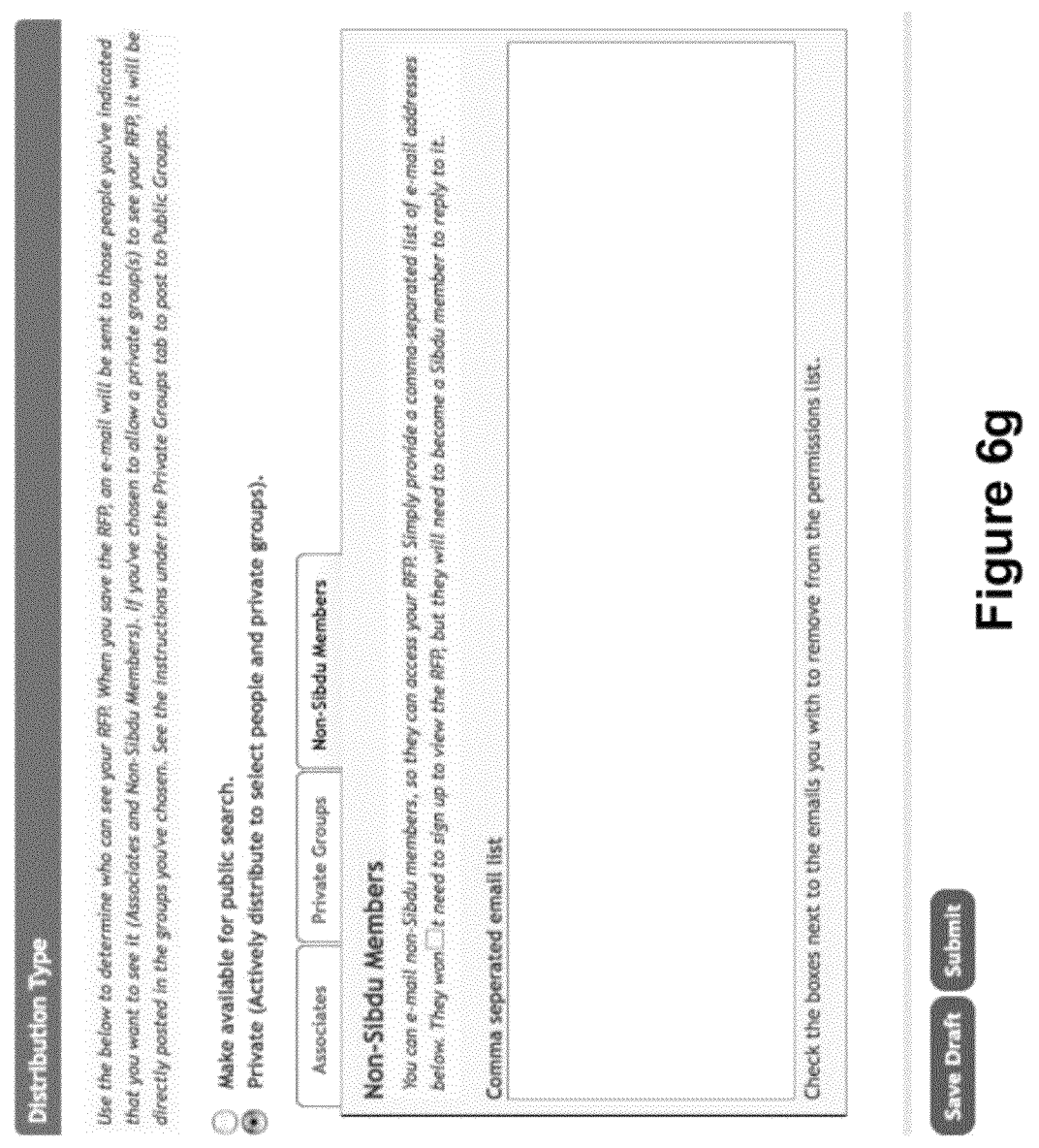

FIG. 6*g* is an interface view 82 illustrating an example of a screen that can be used to identify potential recipients who are not users of the system 20 for a seller request. The system 20 can be configured to automatically prompt such recipients to consider subscribing to the system 20 so that they can participate more comprehensively with the processing by the system 20.

Figure 6H:
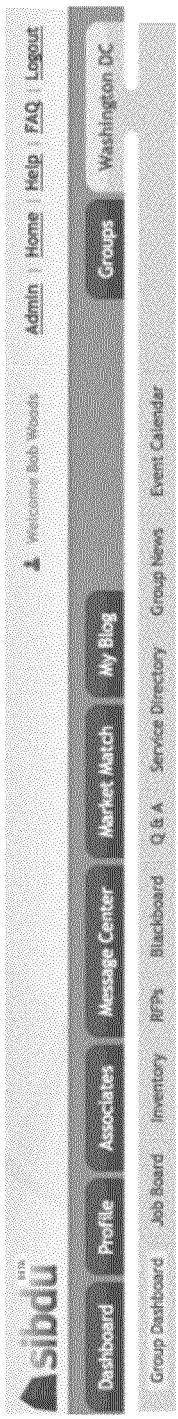
FIG. 6h is an interface view illustrating an example of a menu that can be used to navigate through various options provided by the system.

FIG. 6h is an interface view 82 illustrating an example of a menu that can be used to navigate through various options provided by the system.20 One of the available options is to create post (i.e. transmit, distribute, or broadcast) a request 38 to the desired recipients.

Figure 6I:
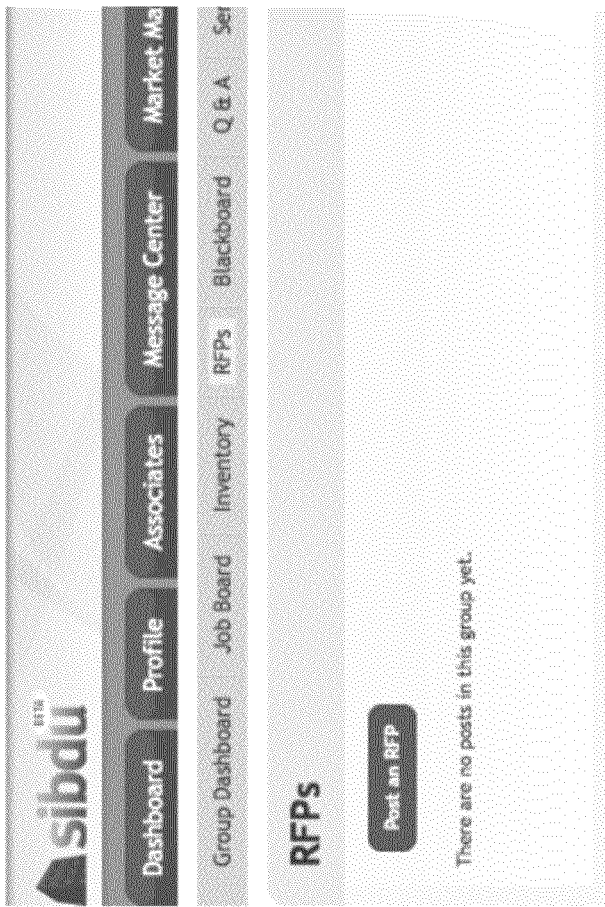
FIG. 6i is an interface view illustrating an example of a screen that can be used to share a particular request with a group made up of a subset of the social network membership.

FIG. 6i is an interface view 82 illustrating an example of a screen that can be used to share a particular request 38 with a group 48 made up of a subset of the social network membership.

Figure 6J:
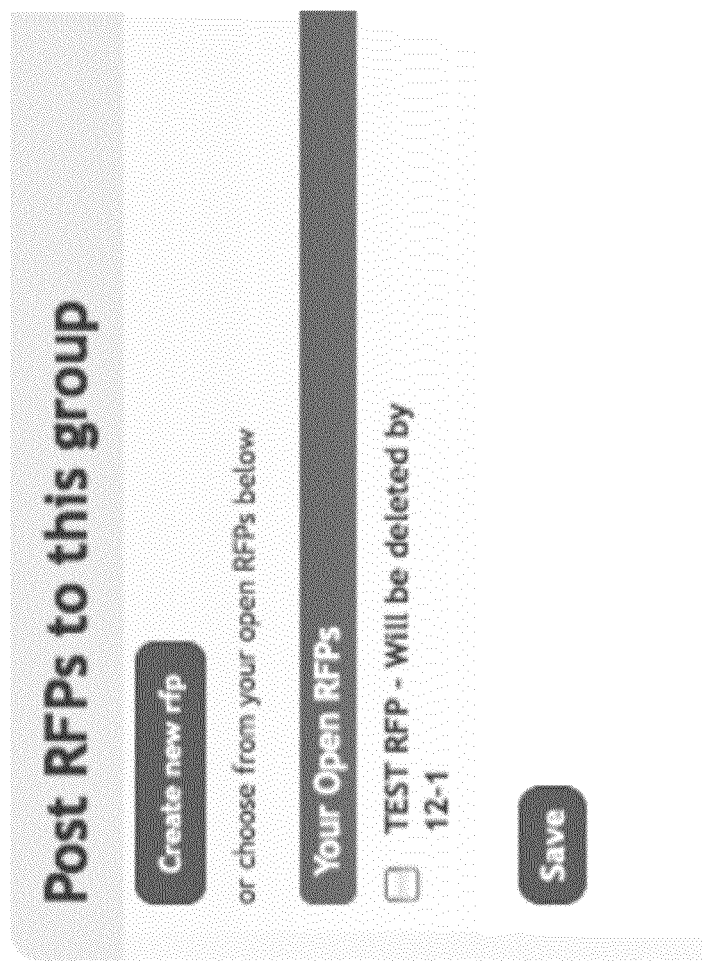
FIG. 6j is an interface view illustrating an example of a screen that can be used to distribute requests to various subsets of the social network membership.

FIG. 6j is an interface view 82 illustrating an example of a screen that can be used to distribute requests 38 to various subsets of the social network membership or select to view the detail of an already active request 38.

Figure 6K:
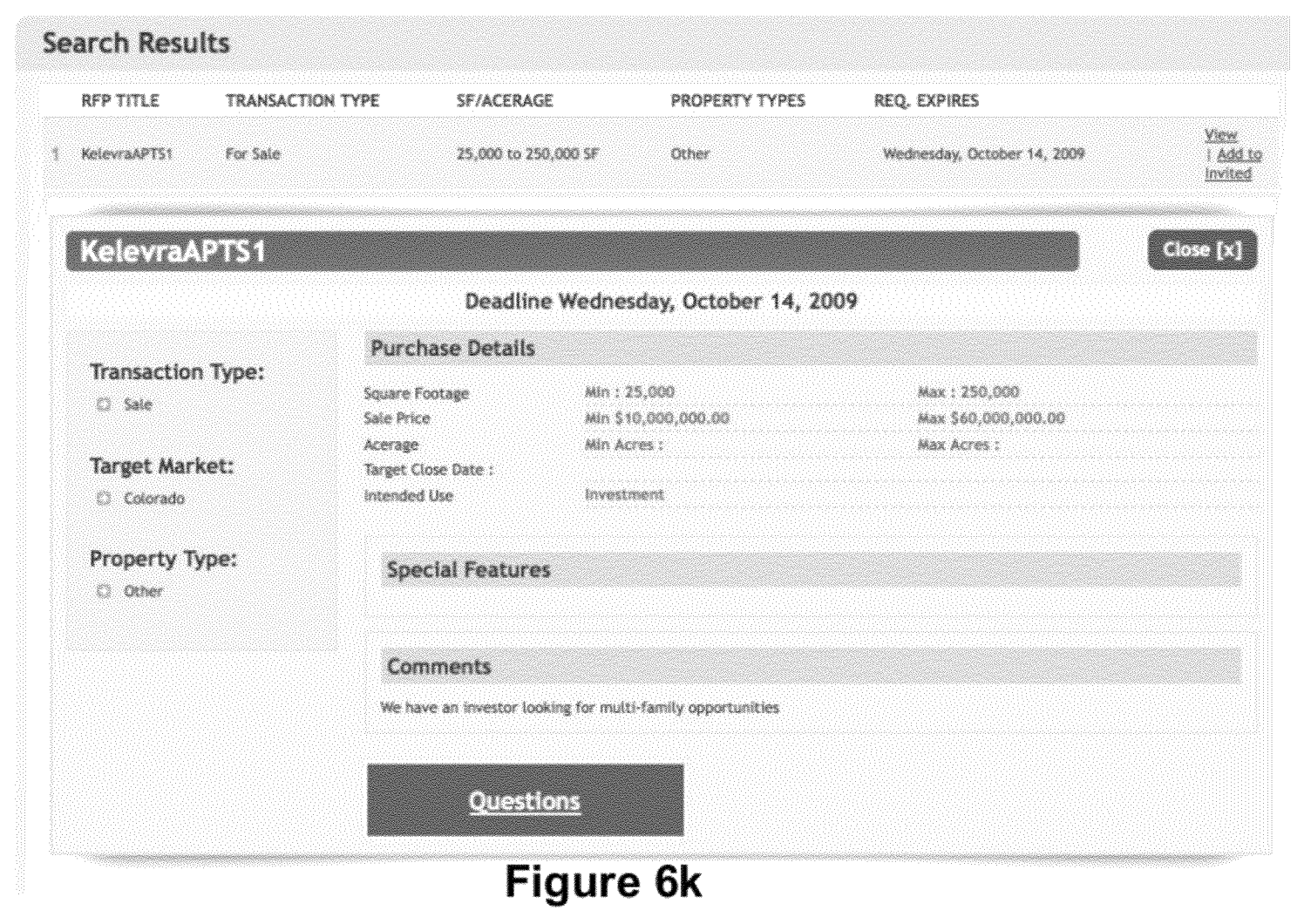

FIG. 6k is an interface view 82 illustrating an example of a screen that can be used to view details pertaining to a pending request 38.

FIG. 6l is an interface view 82 illustrating an example of a screen that displays an overview of a pending request 38.

Figure 6M:
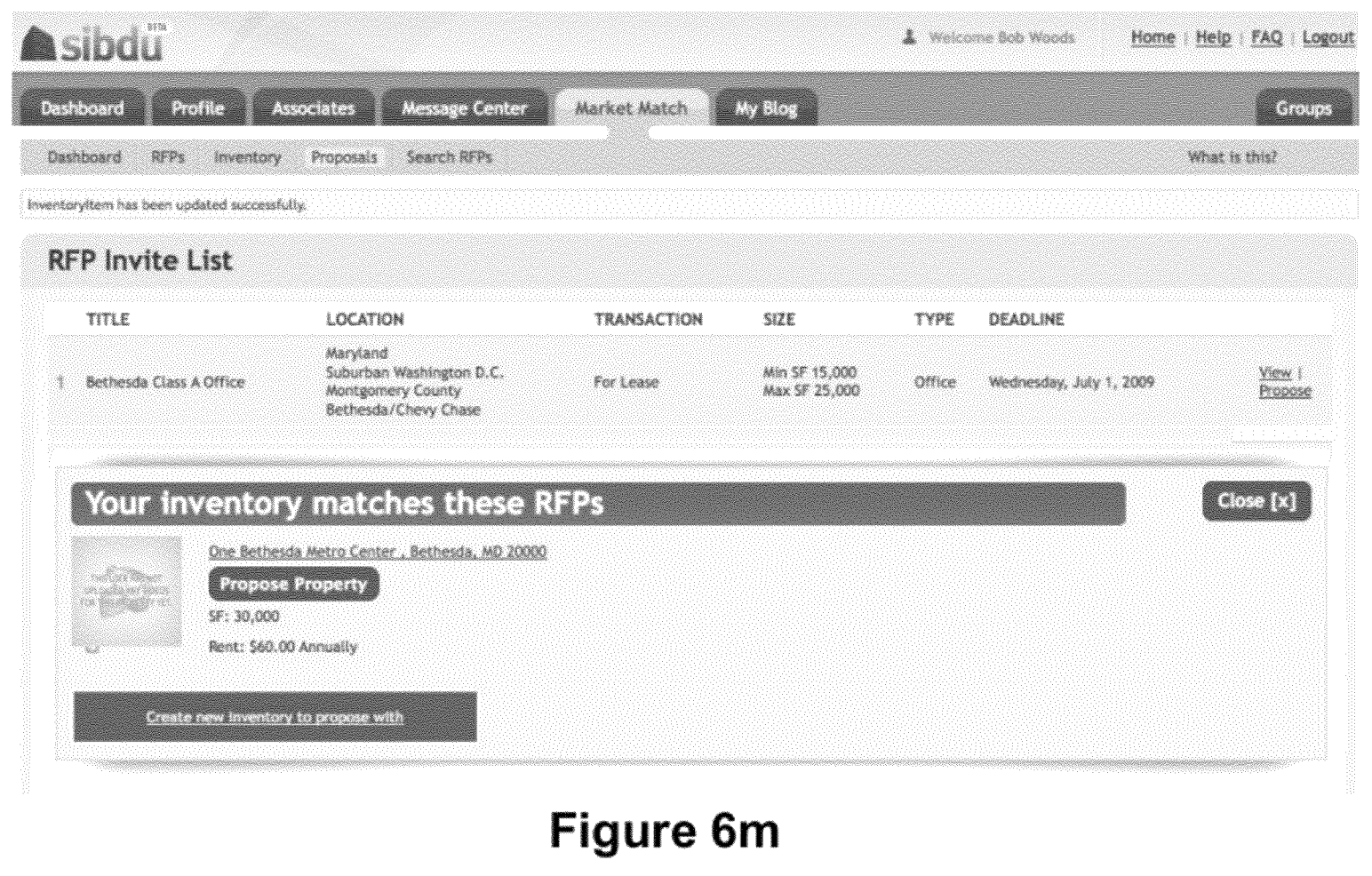

FIG. 6m is an interface view 82 illustrating an example of a screen that can be used by sellers 22 to identify matches 98 between a received request 38 and listings 36 in inventory.

Figures 6N, 6O:
FIG. 6n is an interface view illustrating an example of a menu that can be used to navigate between multiple roles and various requests and proposals associated with those roles.
FIG. 6o is an interface view illustrating an example of a screen that can be used by sellers to manage proposals that they have made in response to various requests.

FIG. 6n is an interface view 82 illustrating an example of a menu that can be used to navigate between multiple roles and various requests 38 and proposals 44 associated with those roles.

FIG. 6o is an interface view 82 illustrating an example of a screen that can be used by sellers 22 to manage proposals 44 that they have made in response to various requests 38.

FIG. 6p is an interface view 82 illustrating an example of a screen that can be used by buyers 24 to manage the various requests 38 that they received through the system 20.

Figure 6Q:
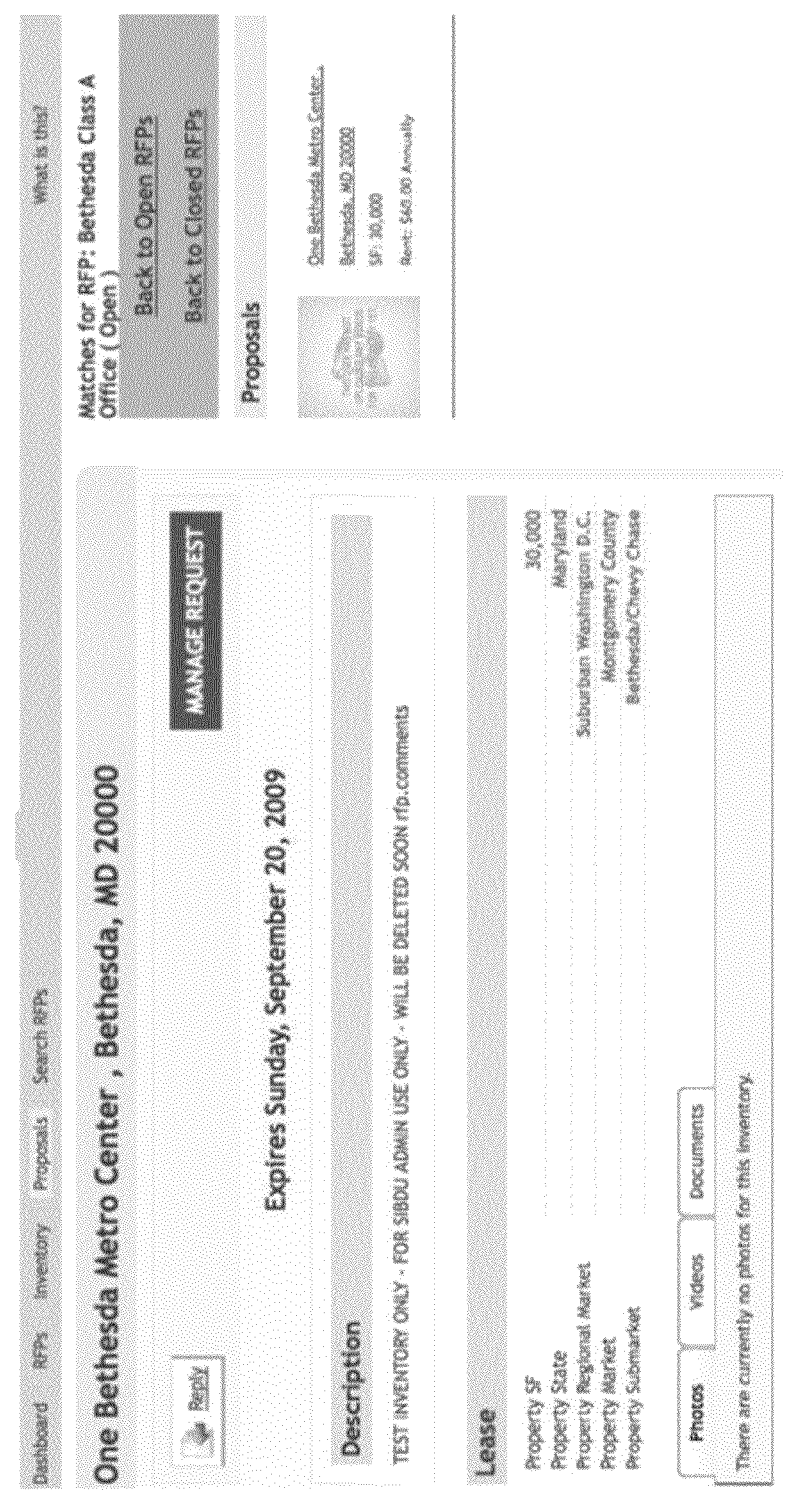

FIG. 6q is an interface view 82 illustrating an example of a screen that can be used by buyers 22 to manage a specific request 28.

FIG. 6r is an interface view 82 illustrating an example of a screen that can be used by buyers to view and manage proposals received in response to their requests.

Figure 6S:
FIG. 6s is an interface view illustrating an example of a screen that can be used to facilitate communications between a buyer and a seller after a seller has responded to a request with a proposal.

FIG. 6s is an interface view 82 illustrating an example of a screen that can be used to facilitate communications between a buyer 24 and a seller 22 after a seller 22 has responded to a request 38 with a proposal 44.

Figure 6T:
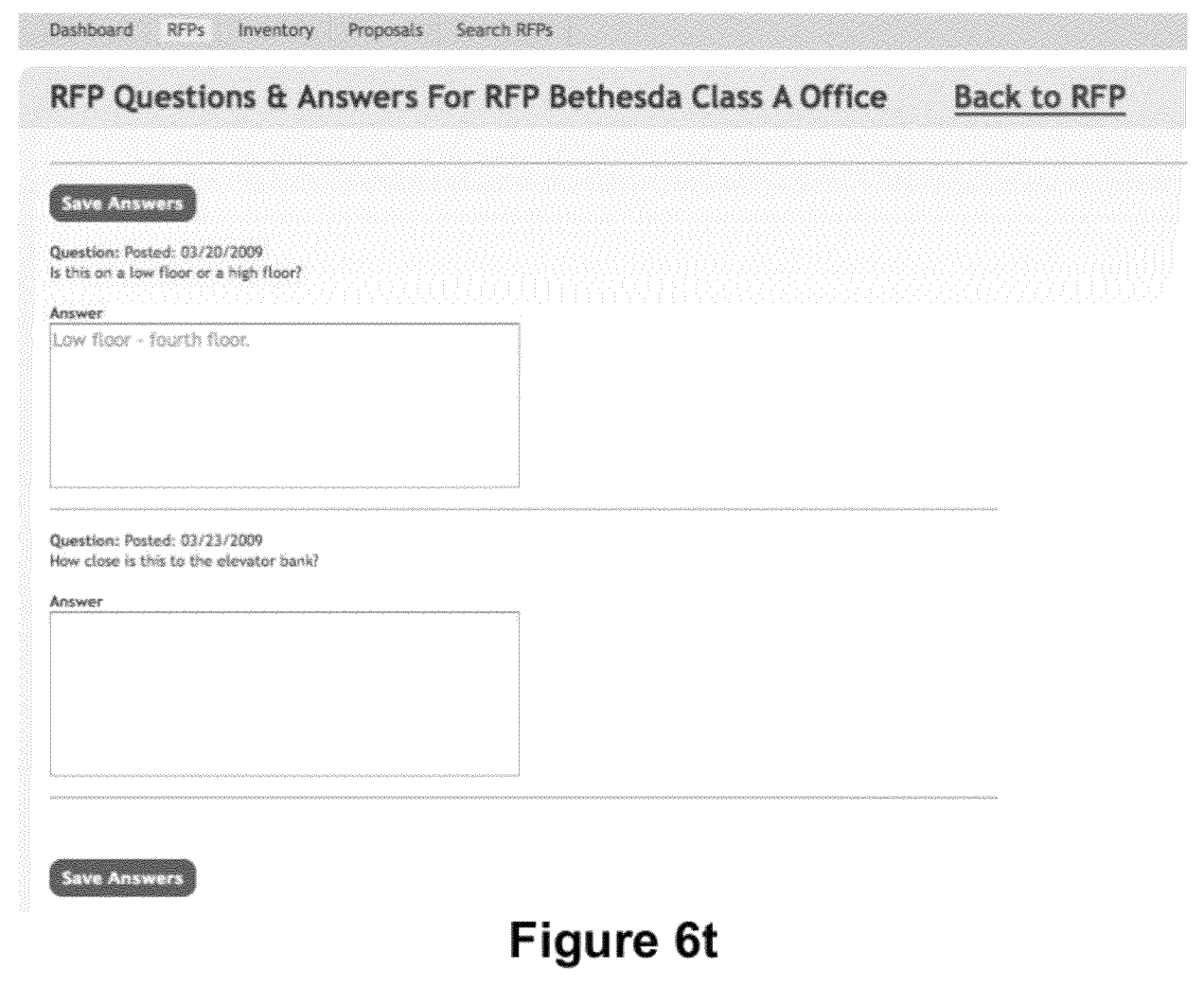

FIG. 6t is an interface view 82 illustrating an example of a screen that can be used to facilitate communications 40 between a buyer 24 and a seller 22 after a seller 22 has responded to a request 38 with a proposal 44.

FIG. 6u is an interface view 82 illustrating an example of a screen that can be used by supply side users (e.g. sellers 22) to view the status 52 of their proposals 44 with respect to specific requests 38 as specified by the applicable demand side users (e.g. buyers 24).

Figures 6V, 6W:
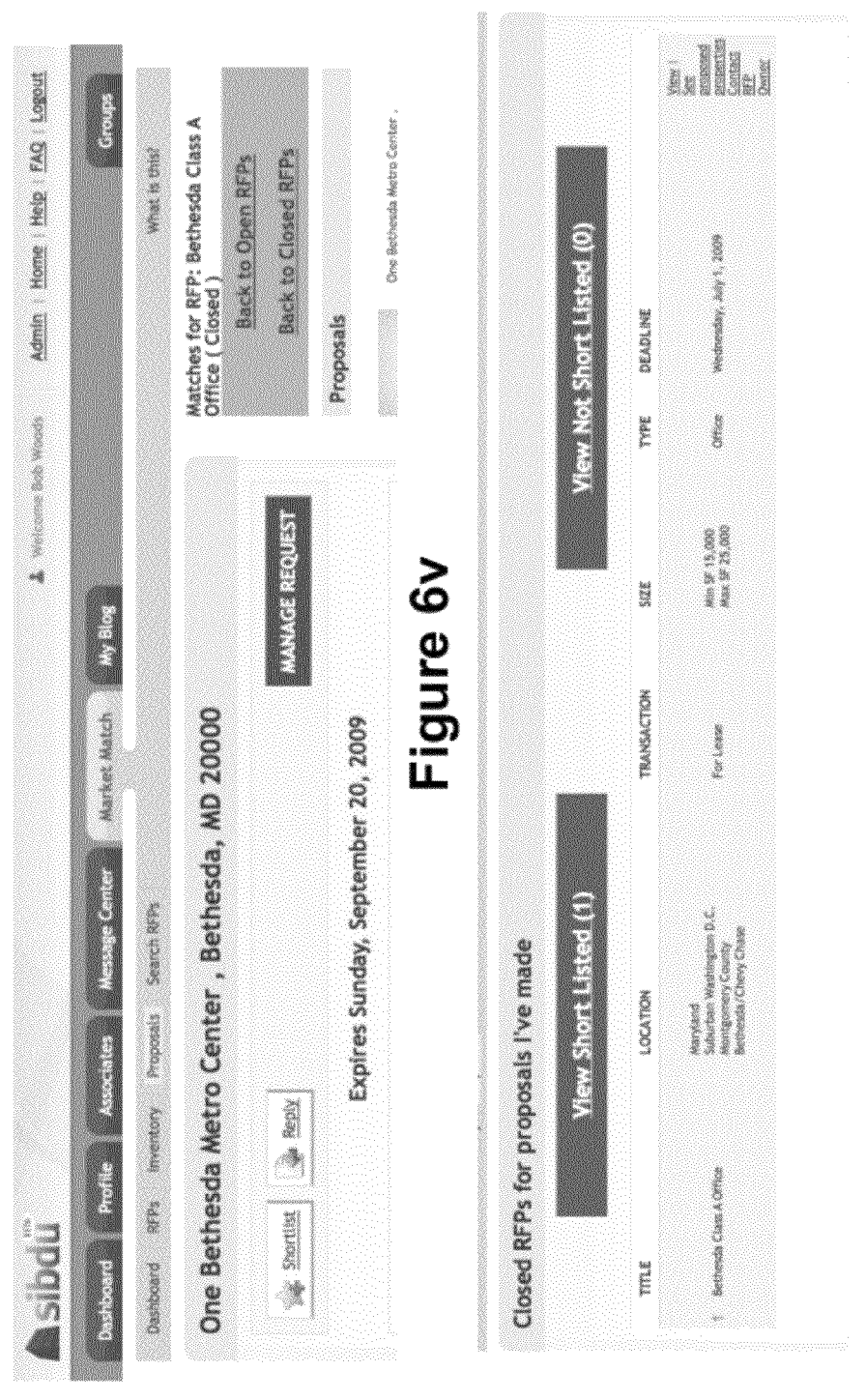

FIG. 6v is an interface view 82 illustrating an example of a screen that can be used by a buyer 24 to shortlist proposals 44 sent in response to the buyer's requests 38.

FIG. 6w is an interface view 82 illustrating an example of a screen that can be used to manage proposals 44 after they have been sent in response to requests 38.

Figure 6X:
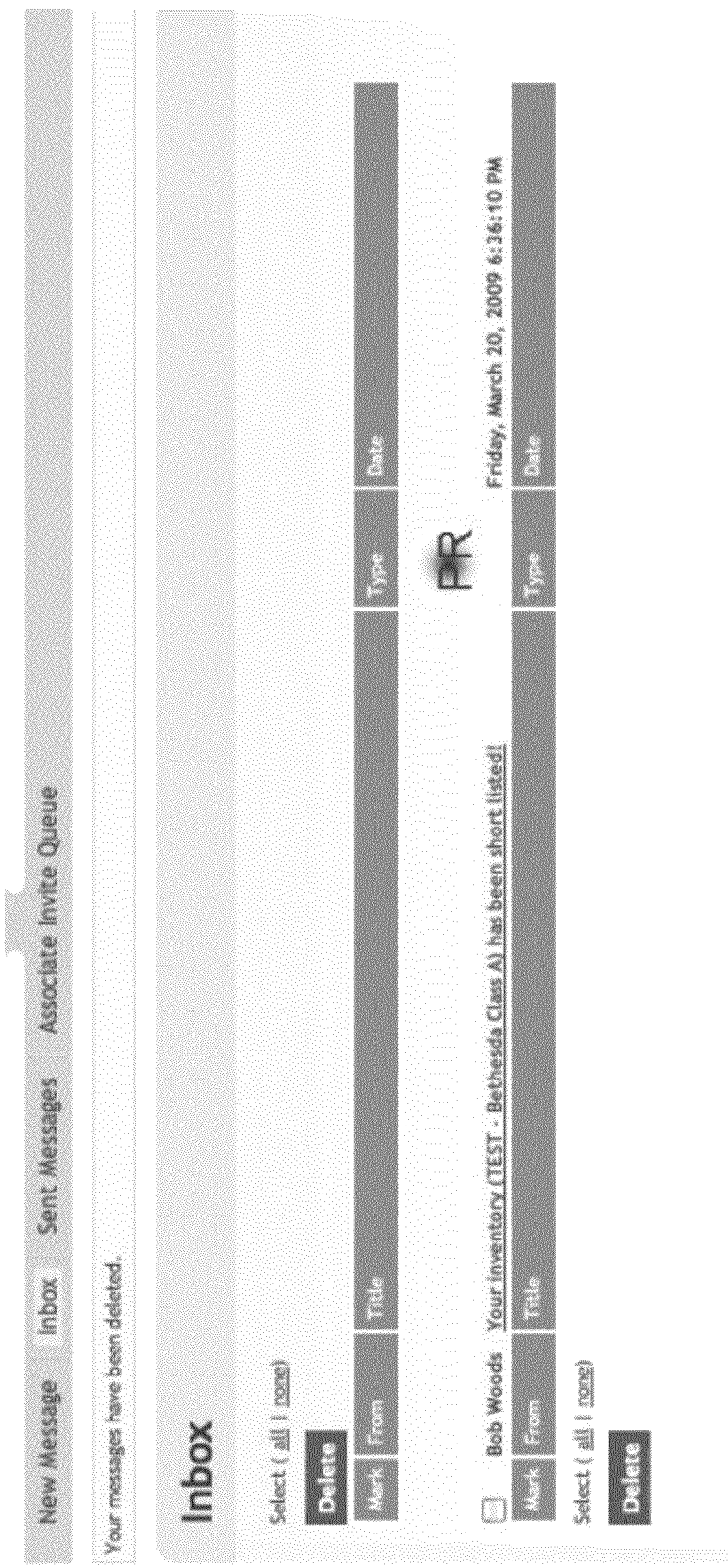
FIG. 6x is an interface view illustrating an example of a screen that can be used by a seller to create, receive, read, send, and delete communications to other users of the system.

FIG. 6x is an interface view illustrating an example of a screen that can be used by a seller 22 to create, receive, read, send, and delete communications 40 to other users of the system 20.

Figure 6Y:
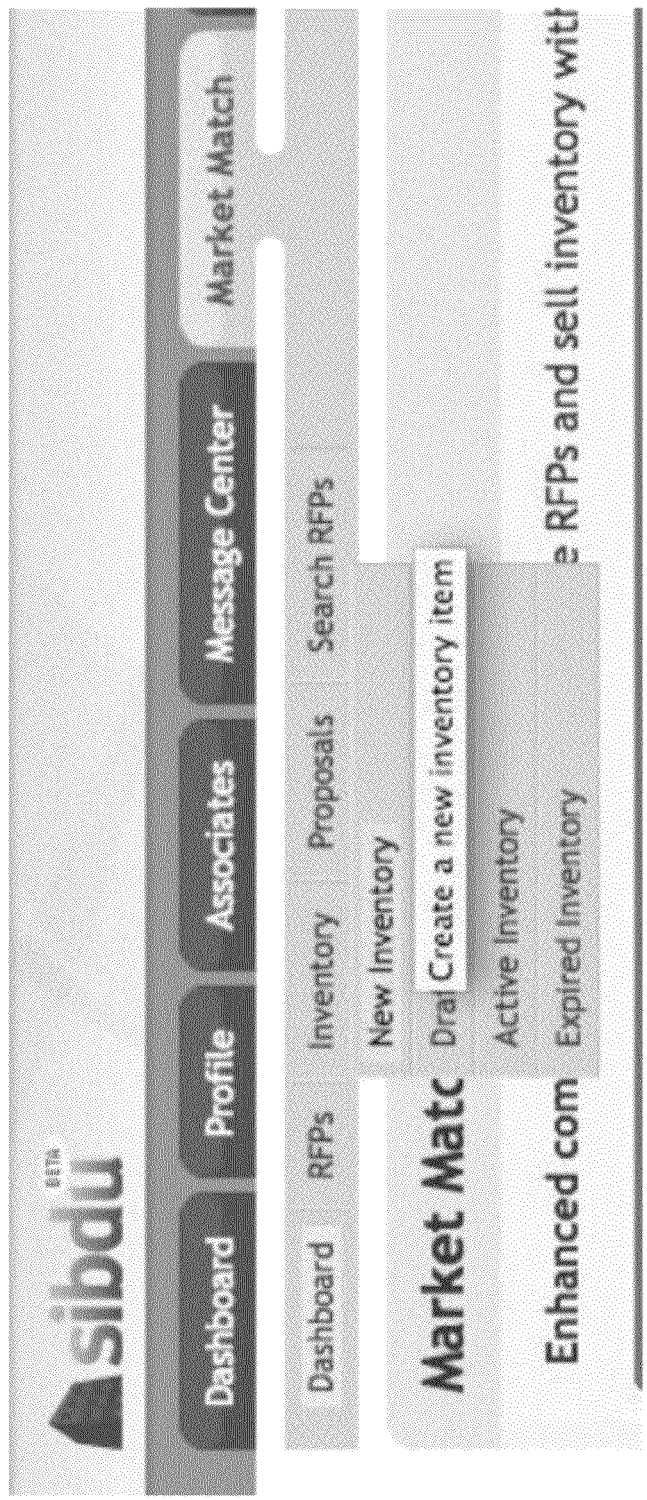
FIG. 6y is an interface view illustrating an example of a menu bar that could be used by a seller to create a new listing for their inventory of offerings.
Figure 6A:
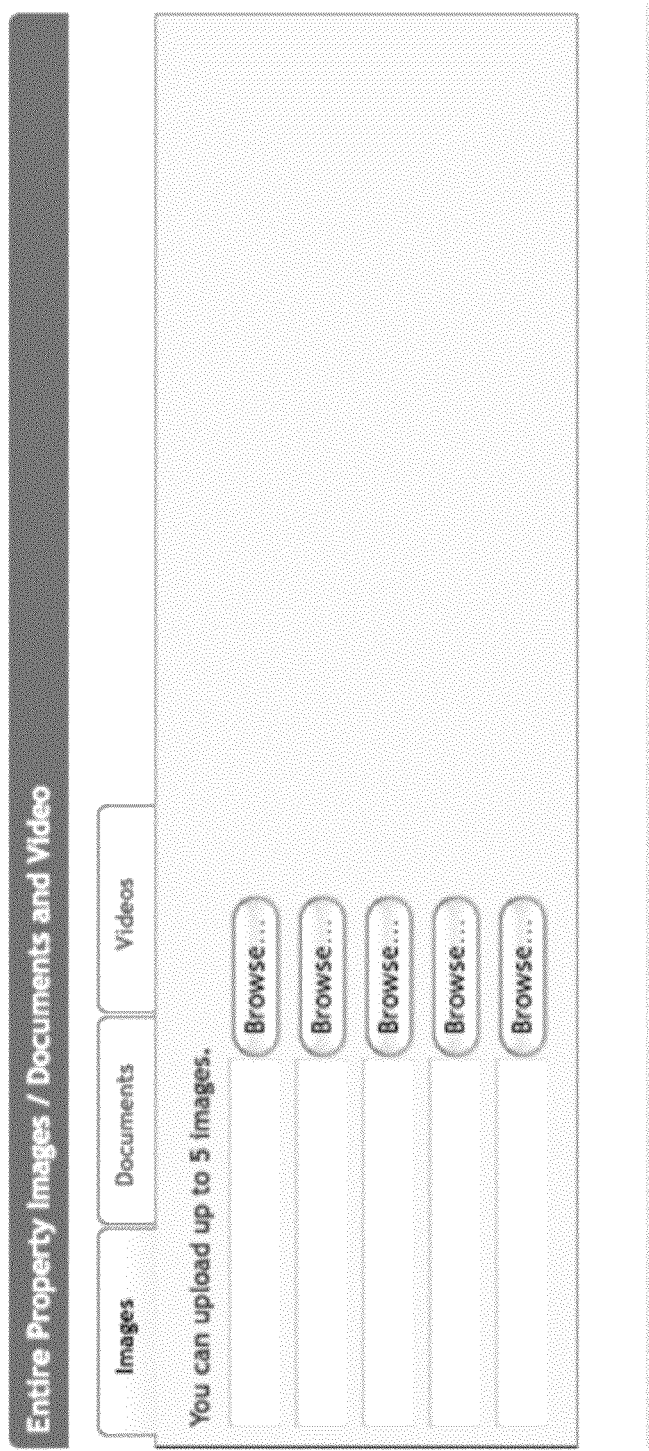

FIG. 6y is an interface view 82 illustrating an example of a menu bar that could be used by a seller 22 to create a new listing for their inventory of listings 36.

FIG. 6z is an interface view 82 illustrating an example of a screen that can be used by a seller 22 to create a listing 36.

FIG. 6aa is an interface view 82 illustrating an example of a screen that be used by buyers 24 and sellers 22 to include images, documents 74, and video files as parts of requests 38 and proposals 44.

VI. Alternative Embodiments

In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope.

The invention claimed is:

1. A transaction system, comprising:
    a computer processor; and
    a computer program, wherein said computer processor provides for running said computer program;
    an information storage component; wherein said information storage component includes a database and wherein said database is accessible to said computer processor;
    wherein said database includes:
        a plurality of groups;
        a plurality of profiles associated with said plurality of groups, said plurality of profiles including a plurality of seller profiles associated with a plurality of sellers and
        a plurality of buyer profiles associated with a plurality of buyers;
        a plurality of listings, wherein at least one said listing is associated with at least one said seller profile;
        a request associated with at least one said buyer profile; and
        a schedule associated with said request;
    wherein said computer program uses said request that is associated with said schedule to selectively identify said seller profile as an interesting seller profile with respect to said request;
    wherein said computer program provides for creating said plurality of groups and associating one or more sellers and one or more buyers to one or more said groups;
    wherein said computer program provides for storing said plurality of groups on said database;
    wherein the at least one group association influences the selective identification of said interesting seller profile;
    wherein at least one said seller associated with at least one said seller profile is also one of said buyers that is associated with at least one said buyer profile;
    wherein said plurality of listings include a plurality of locations; and
    wherein said locations influence the selective identification of said interesting seller profile.

2. The system of claim 1, wherein said database further includes a historical metric associated with one said seller profile, and wherein said historical metric influences the selective identification of said interesting seller profile.

3. The system of claim 1, wherein said request results in the identification of more than one said interesting seller profile.

4. The system of claim 1, wherein at least one said request includes a plurality of desired seller attributes, wherein said plurality of desired seller attributes include a seller category, a geographic area, and a specialty, and wherein said seller attributes selectively influence the identification of said interesting seller profile.

5. The system of claim 1, wherein each said request in said plurality of requests is associated with a response deadline and a status.

6. The system of claim 1, wherein each said listing shares a common listing format, and wherein a response from said interesting seller profile is associated with than one said listing.

7. The system of claim 1, wherein said computer program provides for displaying a seller view, wherein said seller view is associated with at least one said seller profile and wherein said seller view provides for displaying a plurality of proposals and a plurality of statuses associated with said proposals.

8. The system of claim 1, wherein said database includes a plurality of requests associated with a plurality of buyer profiles, wherein said computer program provides for displaying a buyer view, wherein said buyer view is associated with at least one said buyer profile, wherein said buyer view provides for displaying one or more requests associated with said at least one said buyer profile, and wherein at least one displayed request is associated with a status.

9. The system of claim 1, said database including a template communication and a follow-up communication, wherein said computer program provides for automatically generating said follow-up communication from said template communication, and wherein said computer program provides for transmitting said follow-up communication in response to a status change.

10. The system of claim 9, wherein said follow-up communication includes a deadline for a plurality of additional data.

11. The system of claim 1, wherein said computer program further provides for a plurality of news feeds, a plurality of instant messages, a plurality of blogs, a plurality of video chat rooms, and a plurality of video feeds.

12. The system of claim 1, wherein said computer program provides for sending a plurality of responses to at least one said request, wherein each said response is associated with at least one said interesting seller profile, wherein at least one response includes a link to more than one said listing associated with the same interesting seller profile.

13. The system of claim 1, wherein a plurality of interesting seller profiles are selectively identified from a plurality of seller profiles, and wherein the selective identification of said plurality of interesting seller profiles are influenced by at least on seller profile attribute and at least one listing attribute.

14. The system of claim 1, wherein a request is automatically sent to an e-mail address associated with said interesting seller profiles.

15. The system of claim 1, wherein said request is initially anonymous and wherein said computer program provides for receiving an initially anonymous response.

16. The system of claim 1, wherein said request is anonymous until said interesting seller is identified in accordance with said schedule associated with said request.

17. The system of claim 1, further including a plurality of databases, said plurality of databases including a first database that is remote from said second database, wherein said listings are stored on said first database and wherein said seller profile is stored on said second database.

18. A system for facilitating a transaction between a buyer and a seller, comprising:
a computer program being run on a computer processor and accessing a database within an information storage component;
wherein said information storage component provides for storing a plurality of buyer groups, a plurality of buyer profiles associated with said buyer groups, a plurality of seller groups, a plurality of seller profiles associated with said seller groups, and a plurality of listings associated with said seller profiles;
wherein said computer program provides for a seller interface to receive said plurality of listings and a buyer interface to receive a request, wherein said request includes a plurality of desired attributes, wherein said desired attributes include a deadline and a location;
wherein said computer program provides for using said request and said buyer profile associated with said request to selectively identify a subset of listings as interesting listings on said information storage component;
wherein said computer program provides for notifying all said seller profiles associated with said interesting listings of said request without notifying said seller profiles of said buyer profile associated with said request;
wherein said plurality of seller interfaces provide for receiving a plurality of seller groups, a plurality of seller profiles associated with said seller groups, and a plurality of listings associated with said plurality of sellers;
wherein said plurality of buyer interfaces provide for receiving a plurality of buyer groups, a plurality of buyer profiles associated with said buyer groups, and a plurality of requests associated with said plurality of buyers, wherein each said request includes a plurality of desired attributes, and wherein plurality of desired attributes provides for including a specified seller profile;
wherein said information storage component provides for storing said seller groups, said seller profiles, said listings, said buyer groups, said buyer profiles, and said requests;
wherein said computer program provides for selecting identifying a subset of said listings as interesting listings, wherein the selective identification is influenced by said request, a buyer profile, a seller profile, a buyer group, and a seller group;
wherein said computer program provides for automatically notifying all seller profiles associated with said interesting listings of a match;
wherein the buyer profile associated with said request is not revealed until an instruction is received by said buyer interface associated with said buyer profile.

19. The system of claim 18, wherein at least one said listing is a real estate listing.

* * * * *